United States Patent
Yokono

(10) Patent No.: US 10,002,290 B2
(45) Date of Patent: Jun. 19, 2018

(54) LEARNING DEVICE AND LEARNING METHOD FOR OBJECT DETECTION

(71) Applicant: SONY CORPORATION, Tokyo (JP)

(72) Inventor: Jun Yokono, Tokyo (JP)

(73) Assignee: SONY CORPORATION, Tokyo (JP)

(*) Notice: Subject to any disclaimer, the term of this patent is extended or adjusted under 35 U.S.C. 154(b) by 112 days.

(21) Appl. No.: 14/704,696

(22) Filed: May 5, 2015

(65) Prior Publication Data
US 2015/0235079 A1    Aug. 20, 2015

Related U.S. Application Data

(63) Continuation of application No. 13/470,660, filed on May 14, 2012, now Pat. No. 9,053,358.

(30) Foreign Application Priority Data

May 23, 2011    (JP) .................................. 2011-114379

(51) Int. Cl.
  G06K 9/00    (2006.01)
  G06K 9/62    (2006.01)
  G06K 9/46    (2006.01)
(52) U.S. Cl.
  CPC ....... G06K 9/00389 (2013.01); G06K 9/4604 (2013.01); G06K 9/627 (2013.01)
(58) Field of Classification Search
  CPC ... G06K 9/00389; G06K 9/4604; G06K 9/627
  See application file for complete search history.

(56) References Cited

U.S. PATENT DOCUMENTS

| | | | | |
|---|---|---|---|---|
| 2004/0202368 A1* | 10/2004 | Lee | ................... | G06K 9/00624 382/173 |
| 2008/0075361 A1* | 3/2008 | Winn | .................. | G06K 9/3233 382/155 |
| 2010/0086176 A1* | 4/2010 | Yokono | ............. | G06K 9/00369 382/103 |
| 2010/0329517 A1* | 12/2010 | Zhang | ............... | G06K 9/0248 382/118 |
| 2013/0279756 A1* | 10/2013 | Menadeva | ........ | G06K 9/00389 382/103 |

OTHER PUBLICATIONS

Wu, Qiang, et al. "Car plate detection using cascaded tree-style learner based on hybrid object features." Video and Signal Based Surveillance, 2006. AVSS'06. IEEE International Conference on. IEEE, 2006.*

* cited by examiner

*Primary Examiner* — Nirav G Patel
(74) *Attorney, Agent, or Firm* — Chip Law Group

(57) ABSTRACT

Disclosed is a learning device. A feature-quantity calculation unit extracts a feature quantity from each feature point of a learning image. An acquisition unit acquires a classifier already obtained by learning as a transfer classifier. A classifier generation unit substitutes feature quantities into weak classifiers constituting the transfer classifier, calculates error rates of the weak classifiers on the basis of classification results of the weak classifiers and a weight of the learning image, and iterates a process of selecting a weak classifier of which the error rate is minimized a plurality of times. In addition, the classifier generation unit generates a classifier for detecting a detection target by linearly coupling a plurality of selected weak classifiers.

11 Claims, 17 Drawing Sheets

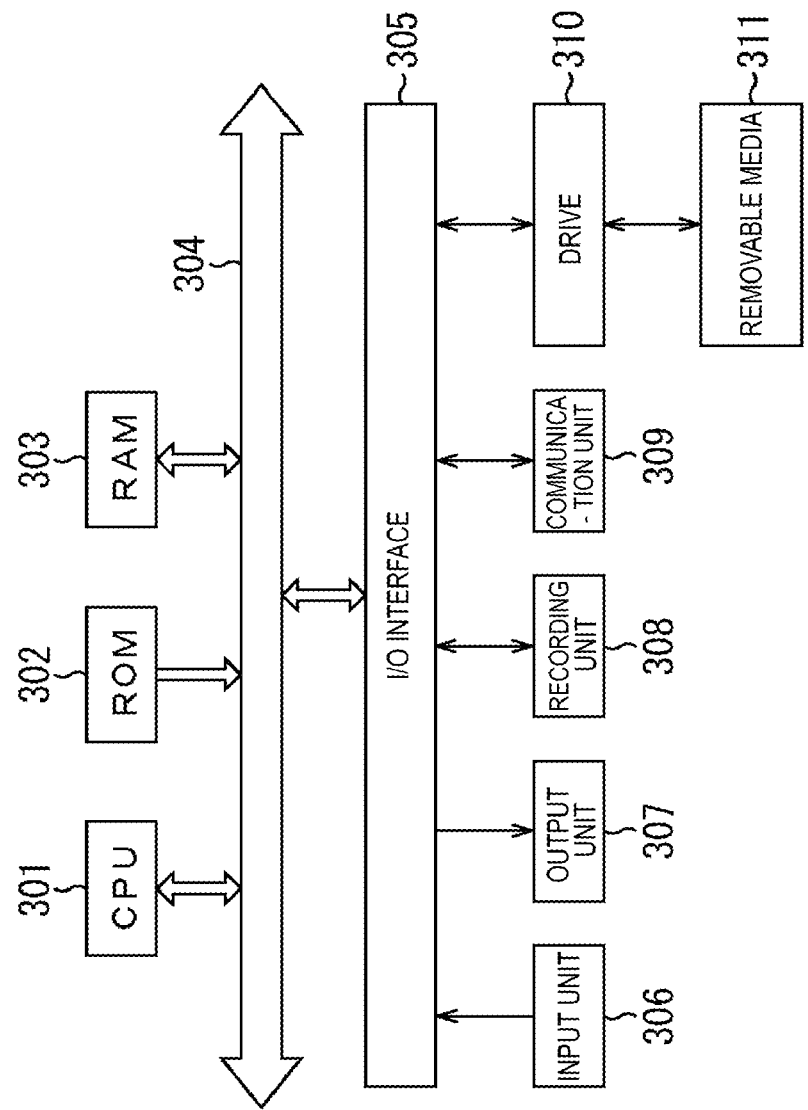

LEARNING DEVICE AND LEARNING METHOD FOR OBJECT DETECTION

CROSS-REFERENCE TO RELATED APPLICATIONS

This application is a continuation application of U.S. patent application Ser. No. 13/470,660, filed on May 14, 2012, which claims priority from Japanese Priority Patent Application JP 2011-114379 filed in the Japan Patent Office on May 23, 2011. Each of the above referenced applications is hereby incorporated by reference in its entirety.

BACKGROUND

The present technology relates to a learning device, a learning method, and a program, and more particularly, to a learning device, a learning method, and a program capable of obtaining a highly accurate classifier at a higher speed.

Although a large number of learning images for hand shapes are necessary, for example, in learning of a multi-class object recognizer such as a hand-shape detector, the learning is time-consuming if a large number of learning images are used. Transfer learning capable of reducing a learning time using previously obtained knowledge has been proposed (for example, see L. Torrey and J. Shavlik, "Transfer Learning," In E. Soria, J. Martin, R. Magdalena, M. Martinez and A. Serrano, editors, Handbook of Research on Machine Learning Applications, IGI Global 2009; and Sinno Jialin Pan and Qiang Yang, "A Survey on Transfer Learning," IEEE Transactions on Knowledge and Data Engineering, Vol. 22, No. 10, pp 1345 to 1359, October 2010).

In addition, recently, object recognition systems using transfer learning have been proposed (for example, see L. Fei-Fei, R. Fergus and P. Perona, "One-Shot learning of object categories," IEEE Trans. Pattern Analysis and Machine Intelligence, Vol. 28, No. 4, pp 594 to 611, 2006; E. Bart, S. Ullman, "Cross-generalization: learning novel classes from a single example by feature replacement," in Proc. CVPR, 2005; and M. Stark, M. Goesele and B. Schiele, "A Shape-Based Object Class Model for Knowledge Transfer," Twelfth IEEE International Conference on Computer Vision (ICCV), 2009, Kyoto, Japan (2009)).

In these object recognition systems, objects are expressed by small parts and appearance and location distributions of the parts are learned and unknown classes are learned by transferring distributions of known classes. In addition, the object recognition systems use a framework of Bayesian estimation and focus on learning of one or more samples or a small number of samples.

SUMMARY

However, it may be impossible to obtain sufficient performance if there are not many learning samples for robust object detection in the real world. It is desirable to obtain a highly accurate classifier at a higher speed.

According to the present embodiment, there is provided a learning device including a feature-quantity extraction unit for extracting a feature quantity from a feature point of a learning image with respect to each of a plurality of learning images including a learning image including a detection target and a learning image not including the detection target, a weak-classification calculation unit for calculating a classification result of the detection target according to a weak classifier for every learning image by substituting the feature quantity corresponding to the weak classifier into the weak classifier with respect to each of a plurality of weak classifiers constituting a transfer classifier, which is a classifier for detecting the detection target obtained by statistical learning, and a classifier generation unit for generating the classifier for detecting the detection target using the weak classifier selected from the plurality of weak classifiers on the basis of the classification result.

The learning device may further include weight setting unit for setting a weight of the learning image based on the classification result, and an error-rate calculation unit for calculating an error rate of the weak classifier based on the classification result of each learning image according to the weak classifier and the weight, wherein the classifier generation unit selects the weak classifier based on the error rate.

The classifier generated by the classifier generation unit may be used for multi-class object recognition.

The classifier generated by the classifier generation unit is a classifier constituting a classifier of a tree structure, and the transfer classifier is a classifier constituting a leaf of the classifier of the tree structure.

A learning method or a program according to the first aspect of the present technology extracts a feature quantity from a feature point of a learning image with respect to each of a plurality of learning images including a learning image including a detection target and a learning image not including the detection target, calculates a classification result of the detection target according to a weak classifier for every learning image by substituting the feature quantity corresponding to the weak classifier into the weak classifier with respect to each of a plurality of weak classifiers constituting a transfer classifier, which is a classifier for detecting the detection target obtained by statistical learning, and detects the detection target using the weak classifier selected from the plurality of weak classifiers on the basis of the classification result, the learning method including extracting, by the feature-quantity extraction unit, the feature quantity from the learning image; and calculates, by the weak-classification calculation unit, the classification result, and generates, by the classifier generation unit, the classifier.

According to the first aspect of the present technology, there is provided a learning device including a feature-quantity extraction unit for extracting a feature quantity from a feature point of a learning image with respect to each of a plurality of learning images including a learning image including a detection target and a learning image not including the detection target, a weak-classification calculation unit for calculating a classification result of the detection target according to a weak classifier for every learning image by substituting the feature quantity corresponding to the weak classifier into the weak classifier with respect to each of a plurality of weak classifiers constituting a transfer classifier, which is a classifier for detecting the detection target obtained by statistical learning, and a classifier generation unit for generating the classifier for detecting the detection target using the weak classifier selected from the plurality of weak classifiers on the basis of the classification result, the learning method including extracting, by the feature-quantity extraction unit, the feature quantity from the learning image; calculating, by the weak-classification calculation unit, the classification result; and generating, by the classifier generation unit, the classifier.

According to the second aspect of the present technology, there is provided a learning device including a feature-quantity extraction unit for extracting a feature quantity from a feature point of a learning image with respect to each of a plurality of learning images including a learning image including a detection target and a learning image not including the detection target, a weak-classification calculation unit for calculating a classification result of the detection target according to a weak classifier for every learning image by substituting the feature quantity corresponding to the weak classifier into the weak classifier with respect to each of a plurality of weak classifiers constituting a transfer classifier, which is a classifier for detecting the detection target obtained by statistical learning, and a classifier generation unit for generating the classifier for detecting the detection target using the weak classifier selected from the plurality of weak classifiers on the basis of the classification result, the learning method including extracting, by the feature-quantity extraction unit, the feature quantity from the learning image;

calculating, by the weak-classification calculation unit, the classification result; and generating, by the classifier generation unit, the classifier.

The learning device may further include a weight setting unit for setting a weight of the learning image based on the classification result; and an error-rate calculation unit for calculating an error rate of the weak classifier based on the classification result of each learning image according to the weak classifier and the weight. The classifier generation unit selects the weak classifier based on the error rate.

The classifier generated by the classifier generation unit is used for multi-class object recognition.

The classifier generated by the classifier generation unit is a classifier constituting a classifier of a tree structure, and the transfer classifier is a classifier constituting a leaf of the classifier of the tree structure.

A learning method for use in a learning device including a feature-quantity extraction unit for extracting a feature quantity from a feature point of a learning image with respect to each of a plurality of learning images including a learning image including a detection target and a learning image not including the detection target, a weak-classifier setting unit for generating a weak classifier based on the feature quantity corresponding to a transfer weak classifier constituting a transfer classifier, which is a classifier for detecting the detection target obtained by statistical learning, among feature quantities extracted from the learning image and the learning image, a weak-classification calculation unit for calculating a classification result of the detection target according to the weak classifier for every learning image by substituting the feature quantity corresponding to the weak classifier into the weak classifier, and a classifier generation unit for generating the classifier for detecting the detection target using the weak classifier selected from the plurality of weak classifiers on the basis of the classification result, the learning method including extracting, by the feature-quantity extraction unit, the feature quantity from the learning image; generating, by the weak-classifier setting unit, the weak classifier; calculating, by the weak-classification calculation unit, the classification result; and generating, by the classifier generation unit, the classifier.

According to the second aspect of the present technology, there is provided a program for causing a computer to execute extracting a feature quantity from a feature point of a learning image with respect to each of a plurality of learning images including a learning image including a detection target and a learning image not including the detection target, generating a weak classifier based on the feature quantity corresponding to a transfer weak classifier constituting a transfer classifier, which is a classifier for detecting the detection target obtained by statistical learning, among feature quantities extracted from the learning image and the learning image. calculating a classification result of the detection target according to the weak classifier for every learning image by substituting the feature quantity corresponding to the weak classifier into the weak classifier, and generating the classifier for detecting the detection target using the weak classifier selected from the plurality of weak classifiers on the basis of the classification result.

According to the first and second embodiments of the present technology as described above, a highly accurate classifier can be obtained at a higher speed.

BRIEF DESCRIPTION OF THE DRAWINGS

FIG. 18 is a diagram illustrating a configuration example of a computer.

DETAILED DESCRIPTION OF THE EMBODIMENT(S)

Figure 1:
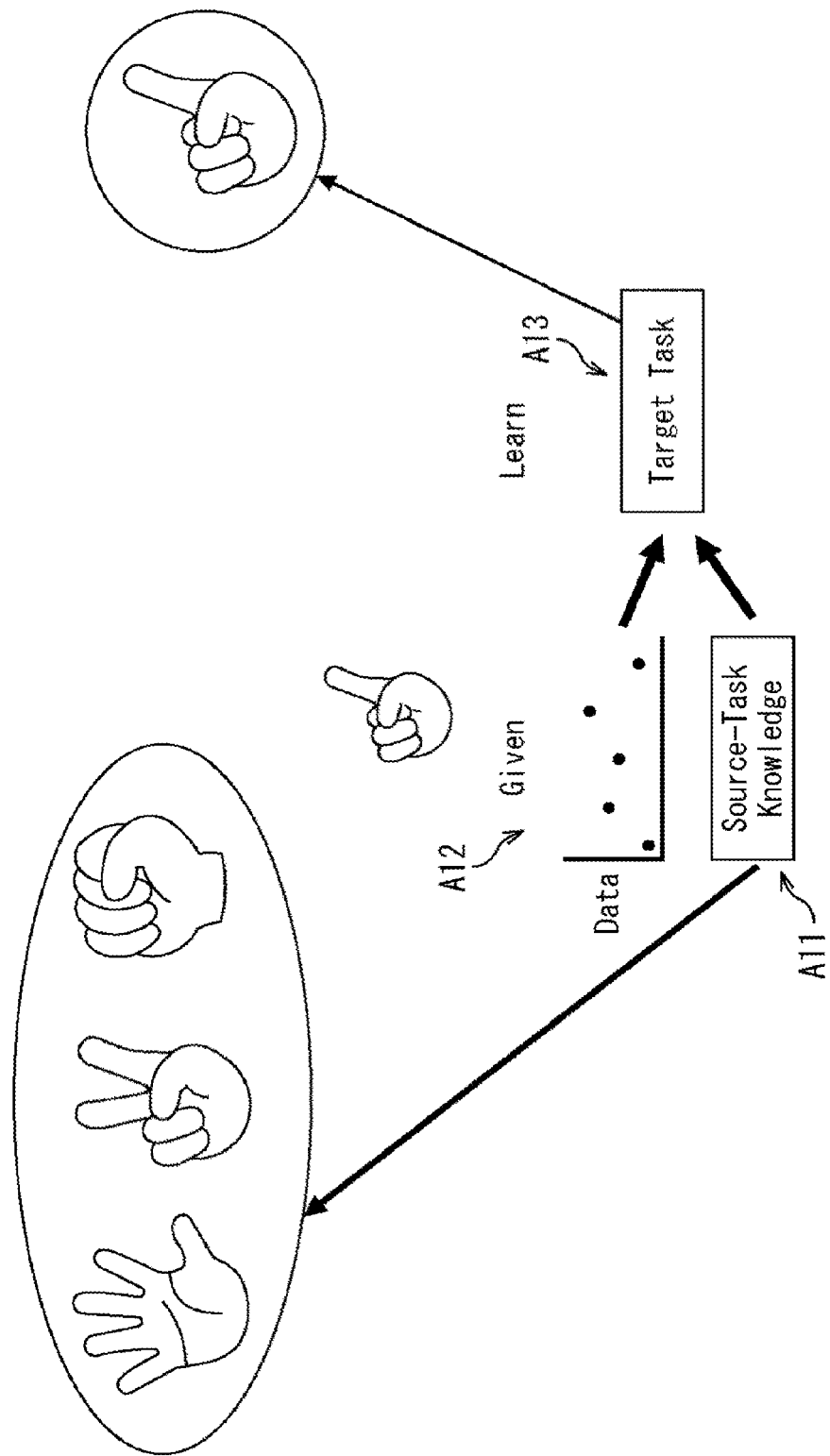
FIG. 1 is a diagram illustrating an overview of the present technology.

Hereinafter, preferred embodiments of the present technology will be described in detail with reference to the appended drawings. Note that, in this specification and the appended drawings, structural elements that have substantially the same function and structure are denoted with the same reference numerals, and repeated explanation of these structural elements is omitted.

Hereinafter, embodiments to which the present technology is applied will be described with reference to the drawings.

(Overview of Present Technology)

The present technology aims at generating a classifier to be used to recognize an object of a detection target according to boosting-based transfer learning. Although the object of the detection target may be any object such as a human or face, an example in which the detection target is a human hand, particularly, a hand with a predetermined shape, will be described hereinafter.

For example, multi-shape hand detection is a difficult problem in an image recognition task. Because a pattern (hand appearance) is largely varied on an image according to hand-shape variation, it is difficult to model each hand-shape class. In addition, it is difficult to perform robust recognition in the real world according to illumination variation or partial concealment, perspective variation, background complexity, and the like as general problems in image recognition. In addition, many learning samples should be provided to handle many shapes.

For example, as illustrated in FIG. 1, transfer learning of hand-shape detection according to the present technology aims at new learning of other hand shapes using knowledge already obtained by learning, and is available for multi-shape hand detection and the like.

For example, it is assumed that classifiers of hand shapes of a rock, scissors, and paper for use in a rock-paper-scissors game have already used and learned a large number of learning samples as indicated by an arrow A11. Here, the rock is a state of the hand in which all fingers are retracted. The scissors are a state of the hand in which the index and middle fingers are extended and the remaining fingers are refracted. The paper is a state of the hand in which all the fingers are extended.

If there are classifiers for detecting some hand shapes as described above, classifiers of already obtained hand shapes are used for learning when a classifier for detecting a hand shape, for example, a shape of a pointing hand in which only the index finger is extended, is obtained by learning.

That is, boosting-based transfer learning is performed using classifiers of hand shapes of the rock, the scissors, and the paper and an image for learning a pointing hand shape indicated by an arrow A12. A classifier for detecting a pointing hand shape indicated by an arrow A13 is generated.

Here, both a detection target of an already obtained classifier and a detection target of a newly generated classifier are the same object (hand), and only a state of the object such as a shape or direction of the hand detected by these classifiers is different. For example, in rock and pointing hand shapes, only an extended index-finger part is different and many other parts such as parts of retracted fingers have similar shapes. If knowledge obtained by learning of the classifier of the hand shape of the rock is used for learning of a classifier of the pointing hand shape, it is possible to obtain a highly accurate classifier at a higher speed.

The classifier obtained as described above includes a plurality of weak classifiers. For example, the weak classifier is a function of outputting a determination result of whether or not a predetermined region is likely to be a detection target if a feature quantity extracted from the predetermined region of an image is substituted as shown in the following Expression (1).

$$f_n(x) = a_n \times g(x > thw_n) + b_n \quad (1)$$

In Expression (1), $a_n$ and $b_n$ are constants. In addition, $g(x > thw_n)$ is a function of outputting a numeric value "1" indicating that the predetermined region is likely to be the detection target if a feature quantity x is greater than a threshold $thw_n$, and outputting a numeric value "0" indicating that the predetermined region is not likely to be the detection target if the feature quantity x is less than or equal to the threshold $thw_n$. Therefore, the predetermined region is determined to be likely to be the detection target if $f_n(x) = a_n + b_n$, and the predetermined region is determined not to be likely to be the detection target if $f_n(x) = b_n$.

A classifier F(x) including the weak classifier $f_n(x)$ as described above is expressed, for example, by the following Expression (2).

$$F(x) = \Sigma f_n(x) \quad (2)$$

That is, the classifier F(x) is a sum of N weak classifiers $f_1(x)$ to $f_n(x)$. In addition, the detection target is determined to be present in the image if an output value of the classifier F(x) is greater than a predetermined threshold th, and the detection target is determined to be absent from the image if the output value of the classifier F(x) is less than or equal to the predetermined threshold th.

When the new classifier F(x) is generated by boosting-based transfer learning using other classifiers already obtained, the following two techniques are considered.

Figure 2:
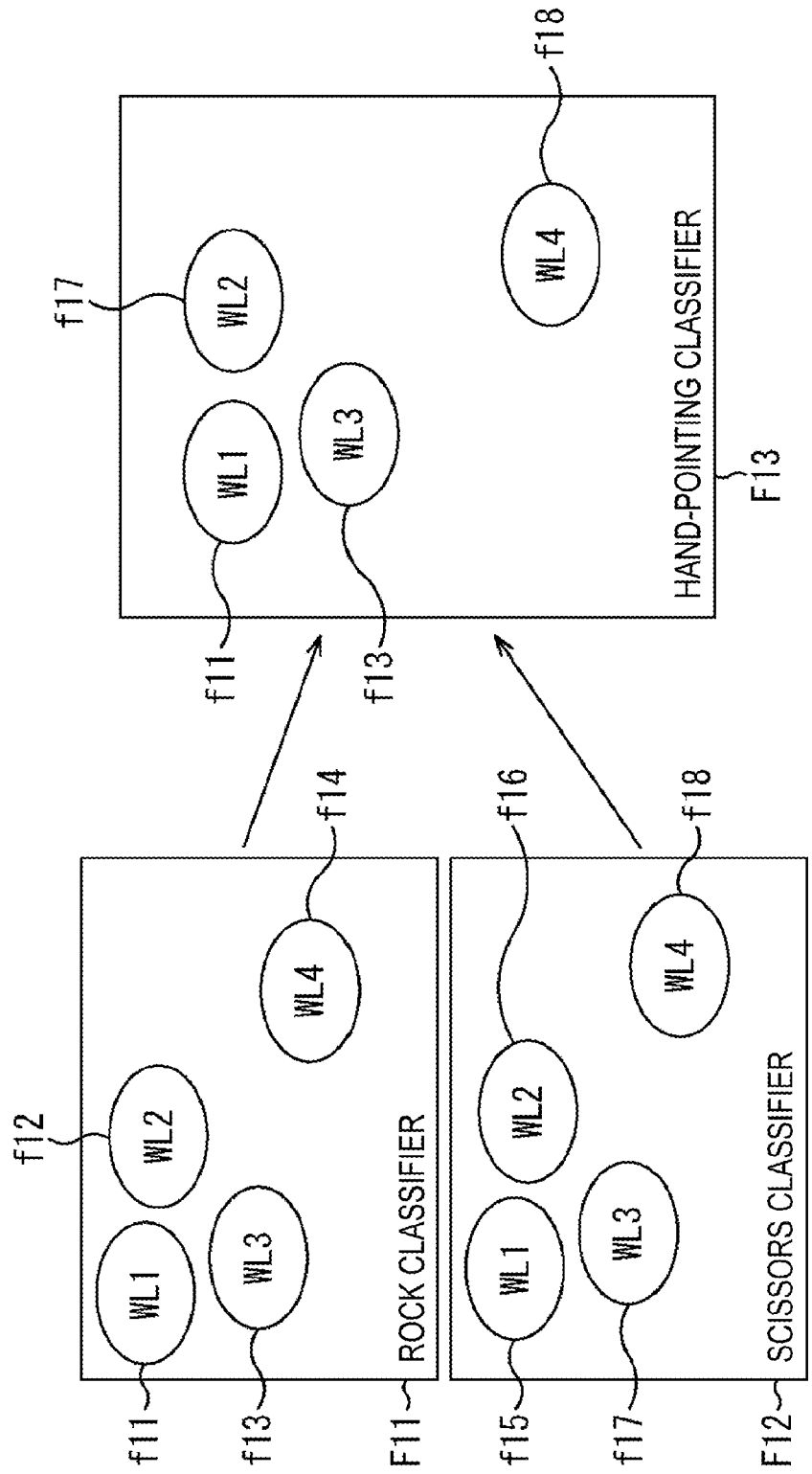
FIG. 2 is a diagram illustrating learning by the transfer of parameters.

(Technique 1) Technique of learning by transferring parameters from other classifiers (Technique 2) Technique of learning by transferring feature quantities from other classifiers For example, in learning by transferring parameters in Technique 1, a pointing-hand detecting classifier F13 is generated from a weak classifier constituting a rock detecting classifier F11 and a weak classifier constituting a scissors detecting classifier F12 already obtained by learning as illustrated in FIG. 2.

In the example of FIG. 2, the classifier F11 includes four weak classifiers f11 to f14, and the classifier F12 includes four weak classifiers f15 to f18. In transfer learning, some weak classifiers suitable for detecting a pointing hand shape are selected from among these eight weak classifiers f11 to f18, and the selected weak classifiers are linearly coupled to be the classifier F13. Here, the classifier F13 includes four weak classifiers f11, f13, f17, and f18.

For example, the weak classifier f11 constituting the classifier F13 is a weak classifier that determines rock likelihood using a feature quantity extracted from a part of a retracted little finger of the rock among the weak classifiers constituting the rock detecting classifier F11. In addition, for example, the weak classifier f17 constituting the classifier F13 becomes a weak classifier that determines scissors likelihood using a feature quantity extracted from a part of an extended index finger of the scissors among the weak classifiers constituting the scissors detecting classifier F12.

As described above, if the weak classifiers, which determine detection target likelihoods for portions common (similar) to detection targets of weak classifiers to be newly generated such as the part of the refracted little finger and the part of the extended index finger, are appropriately combined, it is possible to more easily obtain a highly accurate classifier.

The boosting-based learning is a learning method of configuring one strong classifier by collecting a plurality of classifiers, which are weak alone, as weak classifiers, and a classifier obtained by learning may be preferably used for a fast object detection system. The boosting described above is known as adaptive boosting (AdaBoost). In addition, the boosting-based learning is described in detail, for example, in Paul Viola & Michael Jones', "Robust real-time Object Detection," International Journal of Computer Vision 2001.

Figure 3:
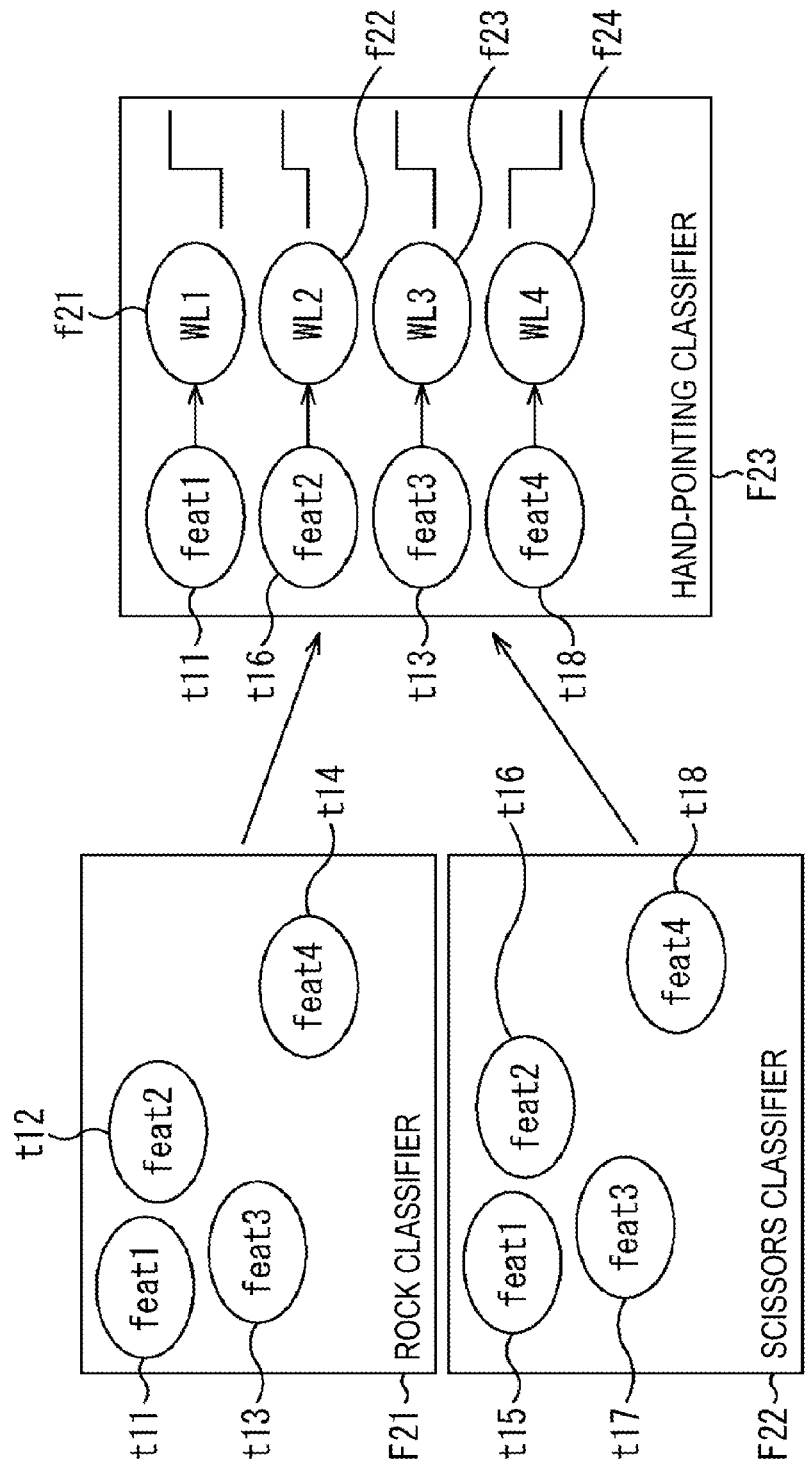
FIG. 3 is a diagram illustrating learning by the transfer of feature quantities.

On the other hand, in learning that transfers feature quantities in the above-described Technique 2, the learning in which feature quantities of weak classifiers constituting a rock detecting classifier F21 and feature quantities of weak classifiers constituting a scissors detecting classifier F22 already obtained by learning are used as illustrated in FIG. 3 is performed.

That is, the classifier F21 includes four weak classifiers. The classifier F21 extracts feature quantities t11 to t14 from an image and these feature quantities t11 to t14 are substituted into the weak classifiers. In addition, the classifier F22 includes four weak classifiers. The classifier F22 extracts feature quantities t15 to t18 from an image and these feature quantities t15 to t18 are substituted into the weak classifiers.

In the transfer learning of a pointing hand shape classifier F23, some feature quantities suitable for detecting a pointing hand shape are selected from among the eight feature quantities t11 to t18, and a weak classifier is generated from the selected feature quantities. That is, the feature quantities suitable for detecting the pointing hand shape are used, so that parameters such as the constants $a_n$ and $b_n$ and the threshold $thw_n$ of Expression (1) constituting the weak classifier are re-learned.

In the example of FIG. 3, the feature quantities t11, t16, t13, and t18 are selected and weak classifiers f21 to f24 are generated from these feature quantities. Specifically, for example, in a plurality of learning images as samples for use in learning, the feature quantity is extracted in the same method as that of extraction of the feature quantity t11 from the same position as an extraction position of the feature quantity t11 and the weak classifier f21 is generated using the extracted feature quantity. That is, in further detail, the feature quantity t11 indicates an extraction position and an extraction method of the feature quantity suitable for detecting the pointing hand shape. If the weak classifiers f21 to f24 are obtained on the basis of selected feature quantities, these weak classifiers are linearly coupled to be the classifier F23.

In the transfer learning illustrated in FIG. 3, a new classifier is generated using a feature quantity of an extraction position and an extraction method suitable for detecting a pointing hand shape among feature quantities that are substituted into weak classifiers of other classifiers already obtained.

Next, specific embodiments will be described in the order of parameter transfer learning of Technique 1 and feature-quantity transfer learning of Technique 2.

First Embodiment

[Configuration Example of Hand-Shape Classification System]

Figure 4:
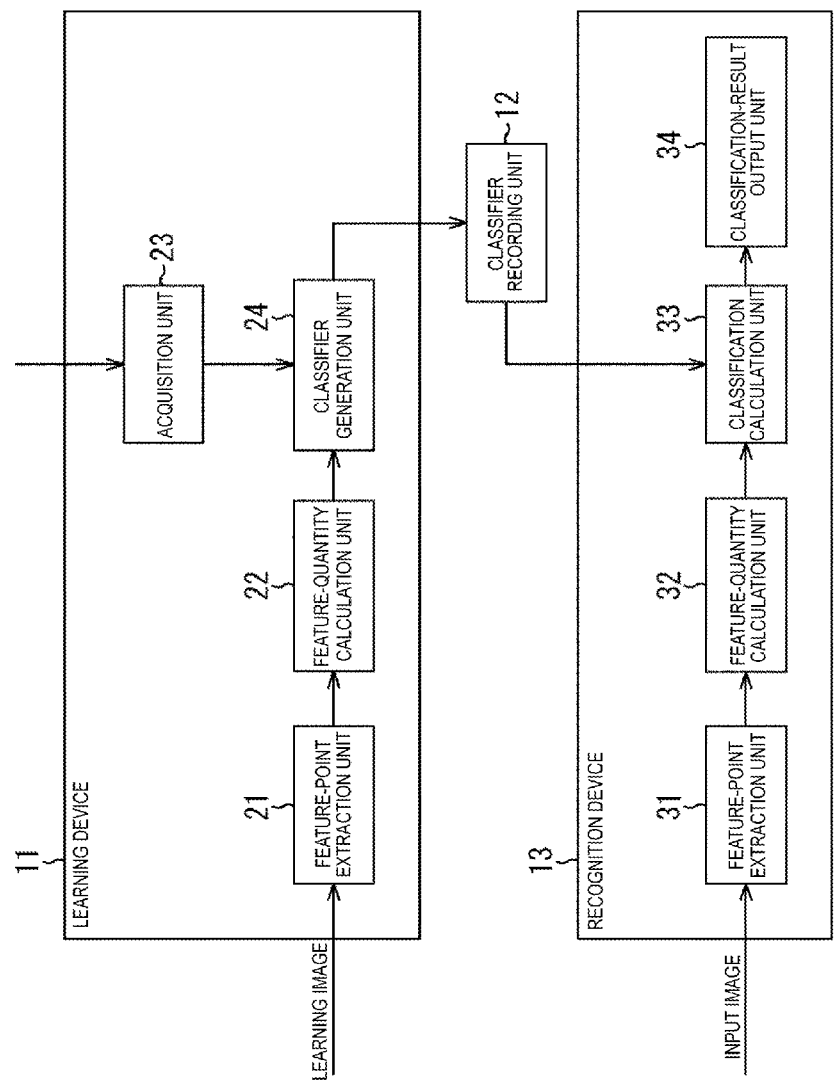
FIG. 4 is a diagram illustrating a configuration example of an embodiment of a hand-shape classification system.

FIG. 4 is a diagram illustrating a configuration example of an embodiment of the hand-shape classification system when the parameter transfer learning of Technique 1 is performed.

The hand-shape classification system includes a learning device 11, a classifier recording unit 12, and a recognition device 13, and detects a hand of a specific shape as a detection target (target object) from an input image.

The learning device 11 is used when a process of classifying the presence/absence of a detection target on the image in the recognition device 13 on the basis of an input learning image is performed, generates a classification feature quantity and a classifier, and causes the classifier recording unit 12 to record the generated feature quantity and classifier. The recognition device 13 classifies whether or not there is the detection target in the input image using the classification feature quantity and the classifier recorded on the classifier recording unit 12, and outputs its classification result.

The learning device 11 includes a feature-point extraction unit 21, a feature-quantity calculation unit 22, an acquisition unit 23, and a classifier generation unit 24.

The feature-point extraction unit 21 extracts a feature point to be used when a classifier is generated from an input learning image, and provides the feature-quantity calculation unit 22 with the extracted feature point and the learning image. The feature-quantity calculation unit 22 calculates a feature quantity of each feature point on the basis of the learning image from the feature-point extraction unit 21, and provides the classifier generation unit 24 with the calculated feature quantity and the learning image.

The acquisition unit 23 acquires some classifiers (hereinafter referred to as transfer classifiers), which are related to an object serving as the same detection target as that of a classifier to be currently generated but related to different states of the object serving as the detection target, from an external device or the like, and provides the acquired classifiers to the classifier generation unit 24.

The classifier generation unit 24 performs, for example, boosting-based transfer learning to generate a classifier that classifies a detection target, on the basis of the learning image and the feature quantity provided from the feature-quantity calculation unit 22 and the transfer classifier provided from the acquisition unit 23. In addition, by designating a feature quantity of a feature point to be used when the detection target is classified using the generated classifier as a classification feature quantity, the classifier generation unit 24 provides the classifier recording unit 12 with the classifier and the classification feature quantity and causes the classifier recording unit 12 to record the classifier and the classification feature quantity.

In addition, the recognition device 13 includes a feature-point extraction unit 31, a feature-quantity calculation unit 32, a classification calculation unit 33, and a classification-result output unit 34. Because the feature-point extraction unit 31 and the feature-quantity calculation unit 32 of the recognition device 13 perform the same processes as the feature-point extraction unit 21 and the feature-quantity calculation unit 22 of the learning device 11, description thereof is omitted.

The classification calculation unit 33 reads the classification feature quantity and the classifier recorded on the classifier recording unit 12. In addition, the classification calculation unit 33 carries out a calculation by substituting a feature quantity corresponding to the classification feature quantity among feature quantities from the feature-quantity calculation unit 32 into the read classifier, and provides its calculation result to the classification-result output unit 34. The classification-result output unit 34 outputs a classification result of whether or not the detection target has been detected from the input image on the basis of the calculation result from the classification calculation unit 33.

[Configuration Example of Classifier Generation Unit]

Figure 5:
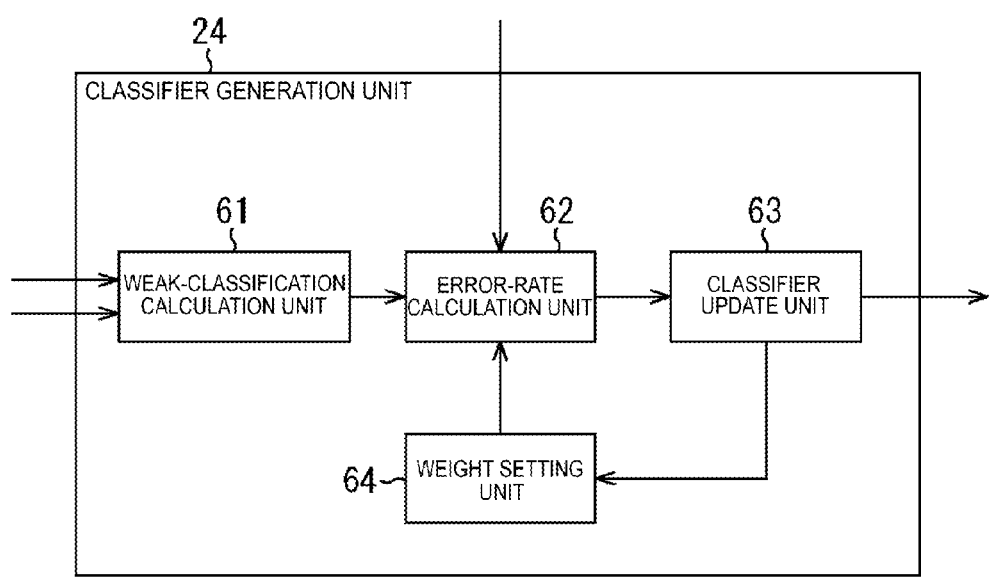
FIG. 5 is a diagram illustrating a configuration example of a classifier generation unit.

In addition, the classifier generation unit 24 of FIG. 4 is configured as illustrated in FIG. 5 in further detail.

The classifier generation unit 24 includes a weak-classification calculation unit 61, an error-rate calculation unit 62, a classifier update unit 63, and a weight setting unit 64.

With respect to each weak classifier constituting the transfer classifier from the acquisition unit 23, the weak-classification calculation unit 61 substitutes the feature quantity extracted from the feature point of the learning image provided from the feature-quantity calculation unit 22 into the weak classifier, and determines whether or not the detection target has been recognized by the weak classifier.

The error-rate calculation unit 62 calculates an error rate of recognition of the detection target by each weak classifier on the basis of the calculation result by each weak classifier provided from the weak classification calculation unit 61, a label added to the learning image from the feature-quantity calculation unit 22, and a weight for every learning image from the weight setting unit 64. It is assumed that the label indicating whether or not the detection target is included in the learning image is added to the learning image. For example, the label is added to the learning image as "1" if the detection target is included in the learning image, and the label is added to the learning image as "−1" if no detection target is included in the learning image.

The classifier update unit 63 selects some weak classifiers having a lowest error rate calculated by the error-rate calculation unit 62 among weak classifiers constituting transfer classifiers, generates a classifier including the selected weak classifiers, and provides the generated classifier and the classification feature quantity to the classifier recording unit 12. In addition, the classifier update unit 63 calculates a degree of reliability based on the error rate of the selected weak classifier, and provides the calculated reliability degree to the weight setting unit 64. The weight setting unit 64 updates a weight for every learning image on the basis of the reliability degree from the classifier update unit 63, and provides the updated weight to the error-rate calculation unit 62.

[Description of Transfer Learning Process]

Next, the transfer learning process by the learning device 11 will be described with reference to the flowchart of FIG. 6. The transfer learning process is started if a learning image including a detection target and a learning image not including the detection target are provided to the learning device 11 and a classifier generation instruction is generated. That is, a plurality of learning images to which the label "1" is added and a plurality of learning images to which the label "−1" is added are provided to the learning device 11.

In step S11, the acquisition unit 23 acquires a plurality of transfer classifiers and provides the acquired transfer classifiers to the weak-classification calculation unit 61 of the classifier generation unit 24. For example, if a classifier for recognizing a hand of a pointing shape is generated thereafter, a rock classifier or a scissors classifier generated by statistical learning such as AdaBoost is acquired as a transfer classifier.

In step S12, the feature-point extraction unit 21 extracts some positions (pixels) as feature points on the learning image for every learning image provided, and provides the feature-quantity calculation unit 22 with the extracted feature points and the learning image.

In step S13, the feature-quantity calculation unit 22 calculates a feature quantity based on the learning image and the feature point provided from the feature-point extraction unit 21.

For example, the feature-quantity calculation unit 22 performs a filtering operation using a filter such as a rectangle filter with respect to a feature point on the learning image, and designates its filtering result as a feature quantity at the feature point. The feature quantity calculation unit 22 calculates a feature quantity of each feature point on the learning image for every learning image, provides the feature quantity of each feature point to the weak-classification calculation unit 61, and provides the learning image to the error-rate calculation unit 62.

In step S14, the weight setting unit 64 initializes a weight for every learning image. For example, if M learning images $P_1$ to $P_M$ are provided, a weight $W_m$ (where $1 \leq m \leq M$) of each learning image becomes 1/M. In addition, the classifier update unit 63 initializes a retained classifier F(x) to 0.

In step S15, the weak-classification calculation unit 61 substitutes a feature quantity of a feature point provided from the feature-quantity calculation unit 22 into a weak classifier constituting a transfer classifier provided from the acquisition unit 23, and recognizes (classifies) a detection target.

For example, k transfer classifiers are provided from the acquisition unit 23 to the weak-classification calculation unit 61, and a sum of weak classifiers constituting the transfer classifiers is assumed to be N. That is, the N weak classifiers $f_1(x)$ to $f_N(x)$ are assumed to be provided to the weak-classification calculation unit 61. In addition, feature quantities $F_n$ (where $1 \leq n \leq N$) of N feature points $FP_n$ corresponding to the weak classifiers $f_1(x)$ to $f_n(x)$ are extracted from each learning image $P_m$ (where $1 \leq m \leq M$) are assumed to be extracted. That is, a feature point $FP_n$ corresponding to the weak classifier $f_n(x)$ is a feature point from which a feature quantity to be substituted into the weak classifier $f_n(x)$ is extracted.

In this case, with respect to each weak classifier $f_n(x)$ (where $1 \leq n \leq N$), the weak-classification calculation unit 61 substitutes the feature quantity $F_n$ of the feature point $FP_n$ for every learning image $P_m$ into the function $g(x>thw_n)$ constituting the weak classifier $f_n(x)$ as a variable x in Expression (1). Its calculation result becomes a classification result at the feature point $FP_n$ in the learning image $P_m$ of the weak classifier $f_n(x)$.

That is, if the feature quantity $F_n$ is greater than the threshold $thw_n$ of the function $g(x>thw_n)$, the detection target is included at the feature point $FP_n$. That is, the detection target is recognized and the numeric value "1" indicating that the detection target is recognized becomes the classification result. On the other hand, if the feature quantity $F_n$ is less than or equal to the threshold $thw_n$, no detection target is included at the feature point $FP_n$. That is, no detection target is recognized and the numeric value "0" indicating that no detection target is recognized becomes the classification result. The weak-classification calculation unit 61 provides the error-rate calculation unit 62 with the classification result obtained as described above.

In step S16, the error-rate calculation unit 62 calculates an error rate of recognition of a detection target by each weak classifier on the basis of the classification result from the weak-classification calculation unit 61, the label added to the learning image from the feature-quantity calculation unit 22, and the weight for every learning image from the weight setting unit 64. That is, the error rate $E_n$ (where $1 \leq n \leq N$) is calculated with respect to each weak classifier $f_n(x)$.

Specifically, the error-rate calculation unit 62 compares the classification result at the feature point $FP_n$ for every learning image $P_m$ to the label added to the learning image $P_m$ with respect to the weak classifier $f_n(x)$, and designates the sum of weights $W_m$ of learning images $P_m$ of which classification results are false recognition as the error rate $E_n$.

For example, if the classification result at the feature point $FP_n$ of the learning image $P_m$ is "1" but the label of the learning image $P_m$ is "−1," that is, if no detection target is actually included in the learning image $P_m$ but the detection target is recognized in the learning image $P_m$ by the weak classifier $f_n(x)$, recognition becomes false. In addition, for example, if the classification result at the feature point $FP_n$ of the learning image $P_m$ is "0" but the label of the learning image $P_m$ is "1," that is, if the detection target is included in the learning image $P_m$ but no detection target is recognized in the learning image $P_m$ by the weak classifier $f_n(x)$, recognition becomes false.

The error rate $E_n$ of the weak classifier $f_n(x)$ obtained as described above indicates the recognition accuracy of the detection target according to the weak classifier $f_n(x)$. The less the error rate $E_n$ of the weak classifier $f_n(x)$ is, the more the weak classifier can be suitable to detect the detection target. When calculating the error rates $E_n$ of the weak classifiers $f_n(x)$, the error-rate calculation unit 62 provides the calculated error rates to the classifier update unit 63.

In step S17, the classifier update unit 63 selects the weak classifier $f_n(x)$ of which the error rate $E_n$ is minimized among the N weak classifiers $f_1(x)$ to $f_n(x)$ on the basis of the error rates $E_n$ of the weak classifiers $f_n(x)$ provided from the error-rate calculation unit 62. That is, the best weak classifier for detecting a hand of a pointing shape serving as the detection target is selected. The classifier update unit 63 acquires the selected weak classifier $f_n(x)$ from the weak-classification calculation unit 61 via the error-rate calculation unit 62.

In step S18, the classifier update unit 63 updates the classifier by adding the weak classifier $f_n(x)$ selected in step S17 to the retained classifier $F(x)$. That is, if the classifier currently retained is $F'(x)$, $F'(x)+f_n(x)$ becomes a new classifier $F(x)$. In addition, at this time, the feature quantity $F_n$ of the feature point $FP_n$ corresponding to the selected weak classifier $f_n(x)$ becomes a classification feature quantity.

In step S19, the weight setting unit 64 updates the weight $W_m$ for every learning image $P_m$, and provides the updated weight of each learning image to the error-rate calculation unit 62.

For example, the classifier update unit 63 calculates a reliability degree $C_n$ expressed by the following Expression (3) on the basis of the error rate $E_n$ of the weak classifier $f_n(x)$ selected in step S17, and provides its calculation result to the weight setting unit 64.

$$C_n = \log((1-E_n)/E_n) \quad (3)$$

The weight setting unit 64 calculates the following Equation (4) on the basis of the reliability degree $C_n$ from the classifier update unit 63, thereby re-calculating the weight $W_m$ of each learning image $P_m$, and normalizing and updating all weights $W_m$, and provides the normalized and updated weights $W_m$ to the error-rate calculation unit 62.

$$W_m = W_m \exp[-C_n \cdot 1_{(y \neq fn)}], \; m=1,2,\ldots M \quad (4)$$

In Expression (4), $y \neq fn$ indicates a condition of the feature point at which false recognition has occurred. Expression (4) indicates that the weight $W_m$ of the learning image $P_m$ including the feature point $FP_n$ at which false recognition has occurred is increased in recognition by the selected weak classifier $f_n(x)$. In addition, in Expression (4), the weight $W_m$ of the learning image $P_m$ in which no false recognition has occurred becomes an unchanged value.

Because the learning image $P_m$ in which the false recognition has occurred is an image from which it is difficult to recognize a detection target, it is possible to obtain a classifier capable of recognizing the detection target with a higher accuracy in the transfer learning if a weight of each learning image is updated so that the weight of this image is increased.

In step S20, the classifier update unit 63 determines whether or not a necessary number of weak classifiers have been selected. For example, if a classifier to be generated is specified to include J weak classifiers, a necessary number of weak classifiers are determined to have been selected when the classifier to be generated includes the J weak classifiers. That is, when the process of steps S15 to S19 is iterated J times, a necessary number of weak classifiers are determined to have been selected.

If a necessary number of weak classifiers are determined not to have been selected in step S20, the process returns to step S15 and the above-described process is iterated. On the other hand, if a necessary number of weak classifiers are determined to have been selected in step S20, the process proceeds to step S21.

In step S21, the classifier update unit 63 outputs the retained classifier $F(x)$ and a classification feature quantity of each weak classifier constituting the classifier to the classifier recording unit 12, causes the classifier recording unit 12 to record the retained classifier $F(x)$ and the classification feature quantity, and ends the transfer learning process. For example, a sum of the selected J weak classifiers becomes the classifier $F(x)$ if the process of steps S15 to S19 have been performed J times.

As described above, the learning device 11 performs the boosting-based transfer learning using the learning image and the transfer classifier already obtained by statistical learning.

If the weak classifiers of other classifiers already obtained are used in the boosting-based learning obtained by a highly accurate classifier as described above, it is possible to obtain a highly accurate classifier at a higher speed.

Figure 7:
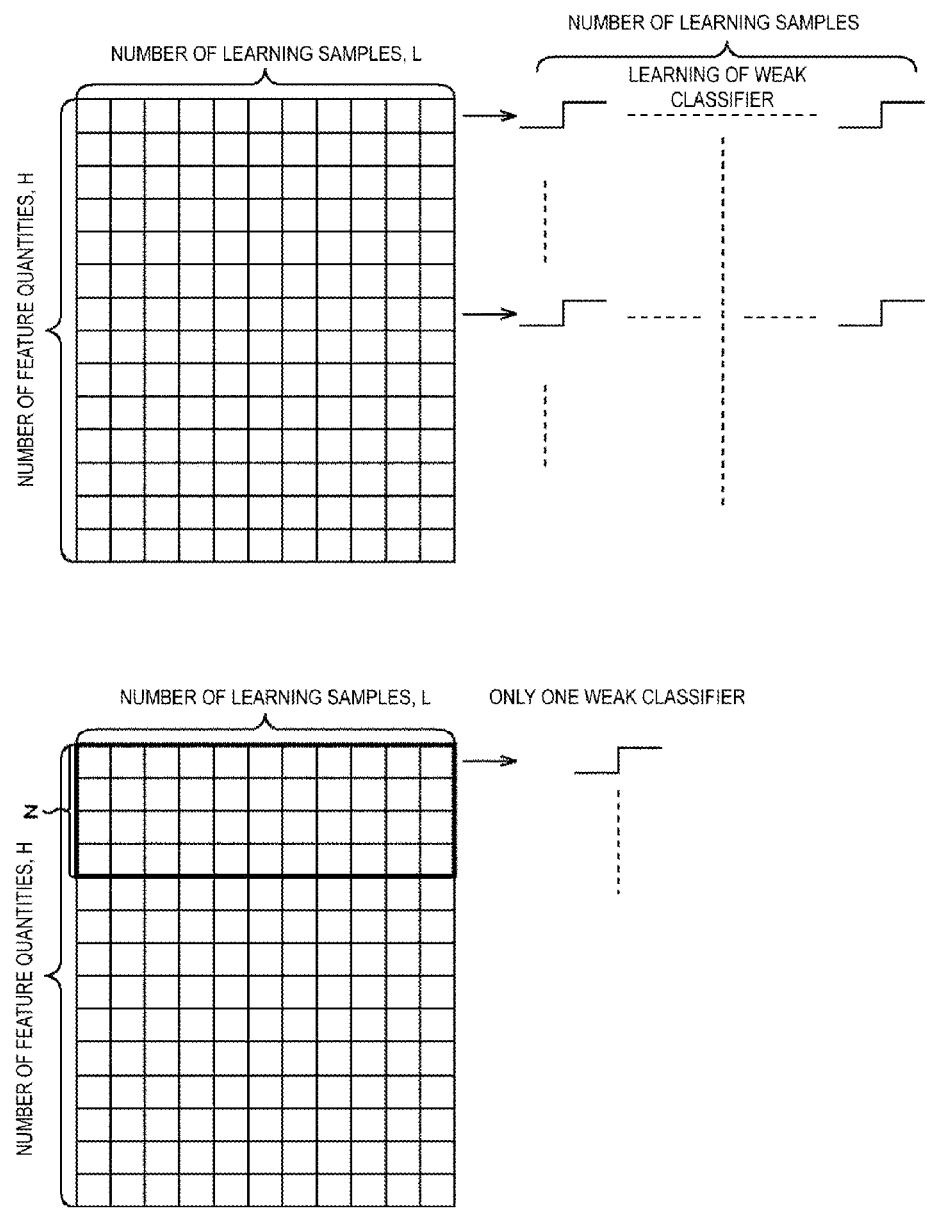
FIG. 7 is a diagram illustrating the effect of learning by the transfer of parameters.

For example, if feature quantities are extracted from H feature points for L learning images (learning samples) in normal boosting-based learning as illustrated in the upper side of FIG. 7, feature quantities are reordered for every L learning images with respect to feature points and weak classifiers are set. One optimum weak classifier is selected from among the H obtained weak classifiers and added to the classifier, so that the classifier is updated and therefore a final classifier is obtained.

On the other hand, if the feature quantities of the H feature points are extracted from each of the L learning images and the classifier is generated in the boosting-based transfer learning as illustrated in the lower side of FIG. 7, Z (where Z<H) weak classifiers constituting the classifier are transferred. One optimum weak classifier is selected from among the Z transferred weak classifiers and added to the classifier, so that the classifier is updated and therefore a final classifier is obtained.

Therefore, it is preferable that a process be performed for feature points of which the number is Z less than H indicating the total number of feature points on each learning image. In addition, because it is unnecessary to set a weak classifier, it is possible to obtain a classifier at a speed that is L×(H/Z) times faster than in the normal boosting-based learning.

[Description of Classification Process]

If a classifier and a classification feature quantity are recorded on the classifier recording unit 12 in the transfer learning process described above, the recognition device 13 can detect a detection target from a provided input image using the classifier and the classification feature quantity.

Figure 8:
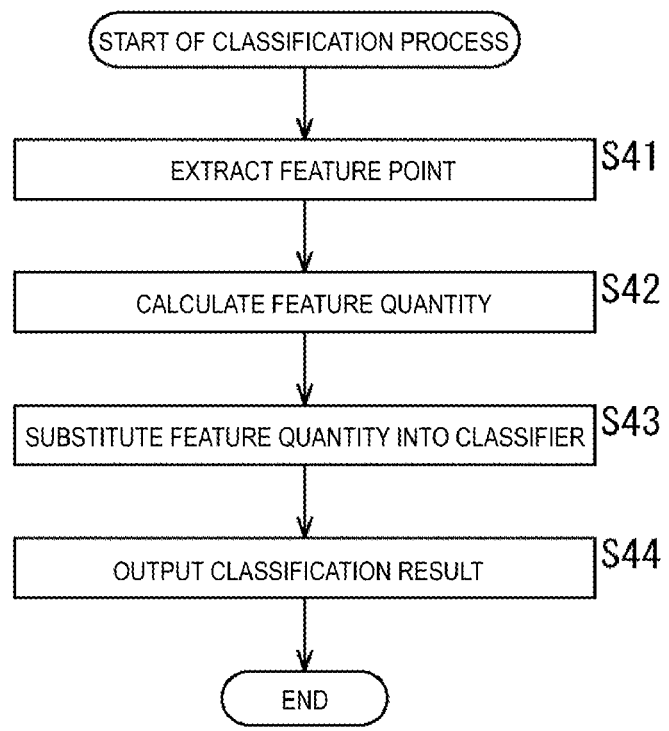
FIG. 8 is a flowchart illustrating a classification process.

Hereinafter, the classification process by the recognition device 13 will be described with reference to the flowchart of FIG. 8.

In step S41, the feature-point extraction unit 31 extracts some positions (pixels) on the provided input image as feature points, and provides the extracted feature points and the input image to the feature-quantity calculation unit 32.

In step S42, the feature-quantity calculation unit 32 calculates feature quantities on the basis of the input image and the feature points provided from the feature-point extraction unit 31, and provides calculation results to the classification calculation unit 33.

For example, the feature-quantity calculation unit 32 performs a filtering operation using a filter such as a rectangle filter with respect to a feature point on the learning image, and designates its filtering result at the feature point as a feature quantity.

Figure 6:
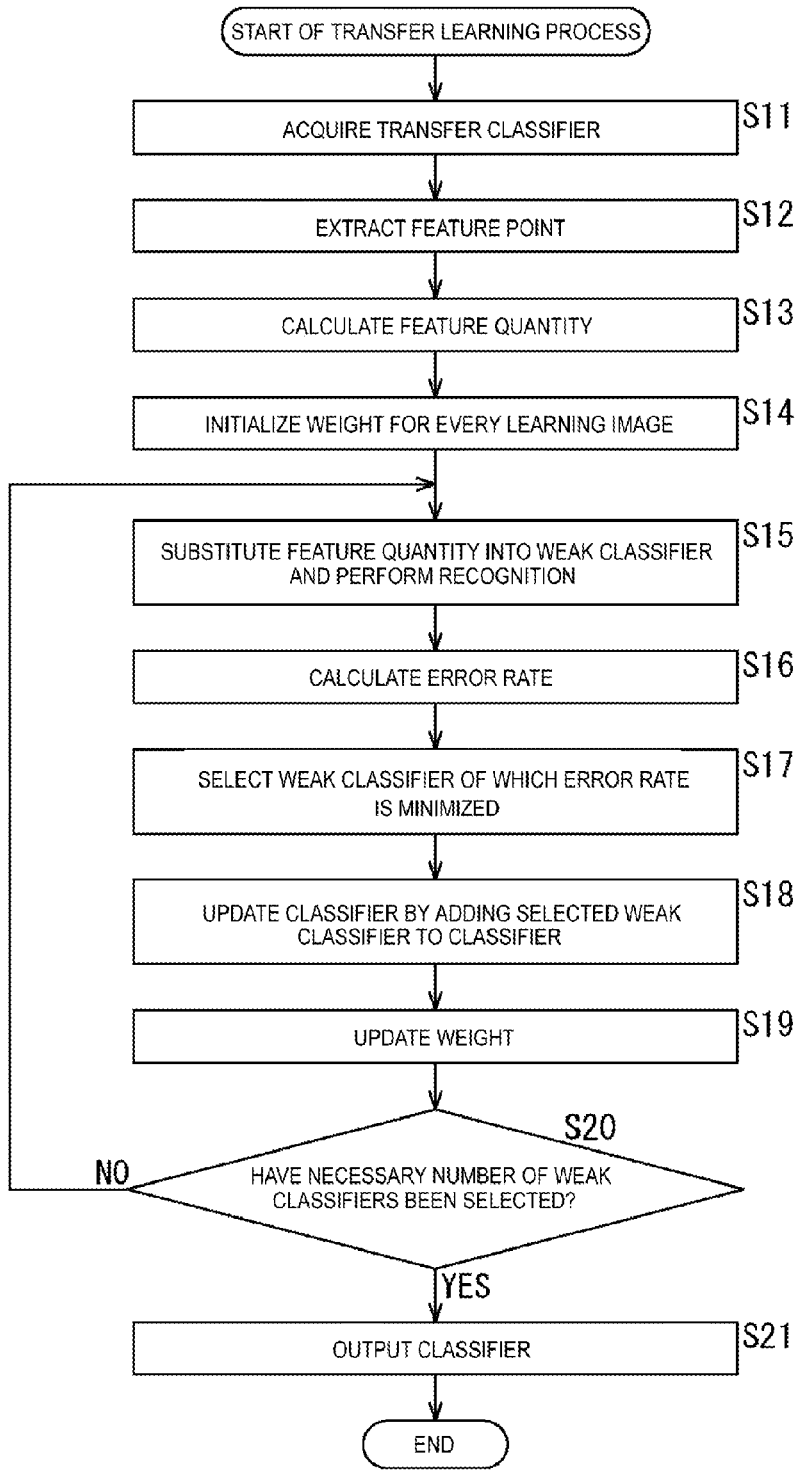
FIG. 6 is a flowchart illustrating a transfer learning process.

In steps S41 and S42, the same process as in steps S12 and S13 of FIG. 6 is performed.

In step S43, the classification calculation unit 33 reads the classifier F(x) and the classification feature quantity from the classifier recording unit 12, and carries out a calculation by substituting the feature quantity into the read classifier. That is, the classification calculation unit 33 carries out a calculation by substituting a feature quantity corresponding to the classification feature quantity among feature quantities from the feature-quantity calculation unit 32 into the classifier shown in Expression (2). Here, the feature quantity to be substituted into a weak classifier constituting the classifier is a feature quantity of a feature point on the input image having the same position as the feature point of the learning image of which a feature quantity serving as the classification feature quantity is obtained.

The classification calculation unit 33 designates a numeric value "1" indicating that there is a detection target in the input image as a classification result if an output value obtained by the calculation of Expression (2) is greater than a threshold th, and designates a numeric value "−1" indicating that there is no detection target in the input image as a classification result if the output value is less than or equal to the threshold th. The classification calculation unit 33 provides the classification result obtained as described above to the classification-result output unit 34.

In step S44, the classification-result output unit 34 outputs the classification result provided from the classification calculation unit 33, and ends the classification process. For example, the classification-result output unit 34 causes a display unit (not illustrated) to display the fact of whether the detection target has been detected or not been detected from the input image on the basis of the classification result.

As described above, the recognition device 13 detects the detection target from the input image using the classifier and the classification feature quantity recorded on the classifier recording unit 12. It is possible to detect the detection target with a higher accuracy by detecting the detection target using a classifier obtained by the boosting-based transfer learning.

Second Embodiment

[Configuration Example of Learning Device]
Subsequently, the configuration of the learning device when the above-described feature-quantity transfer learning of Technique 2 is performed will be described.

Figure 9:
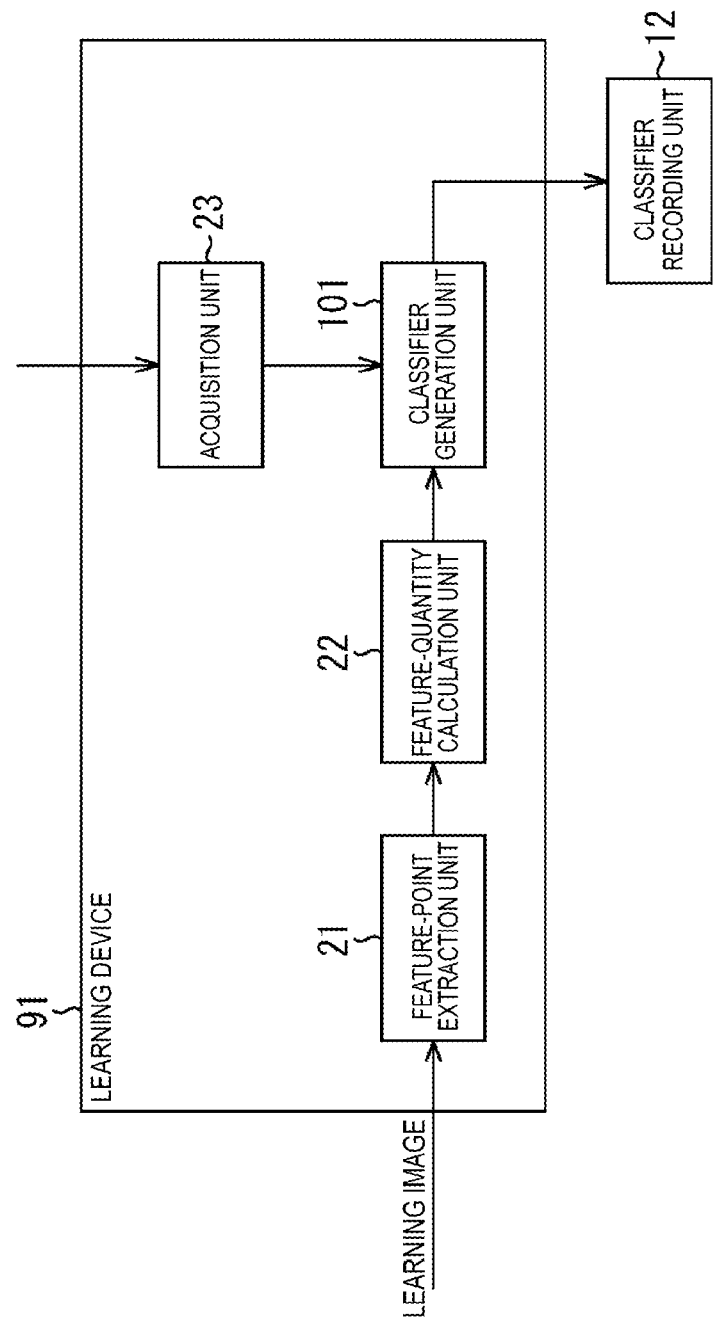
FIG. 9 is a diagram illustrating another configuration example of a learning device.

FIG. 9 is a diagram illustrating a configuration example of an embodiment of the learning device when the feature-quantity transfer learning is performed. Parts corresponding to those of FIG. 4 are denoted by the same reference numerals in FIG. 9, and description thereof is properly omitted.

The learning device 91 includes a feature-point extraction unit 21, a feature-quantity calculation unit 22, an acquisition unit 23, and a classifier generation unit 101.

The classifier generation unit 101 performs, for example, an AdaBoost-based transfer learning process, on the basis of a learning image and a feature quantity provided from the feature quantity calculation unit 22 and a classification feature quantity of each weak classifier constituting a transfer classifier provided from the acquisition unit 23, thereby generating a classifier. In addition, the classifier generation unit 101 provides the classifier recording unit 12 with the generated classifier and the classification feature quantity of the weak classifier constituting the classifier, and causes the classifier recording unit 12 to record the generated classifier and the classification feature quantity.

Figure 10:
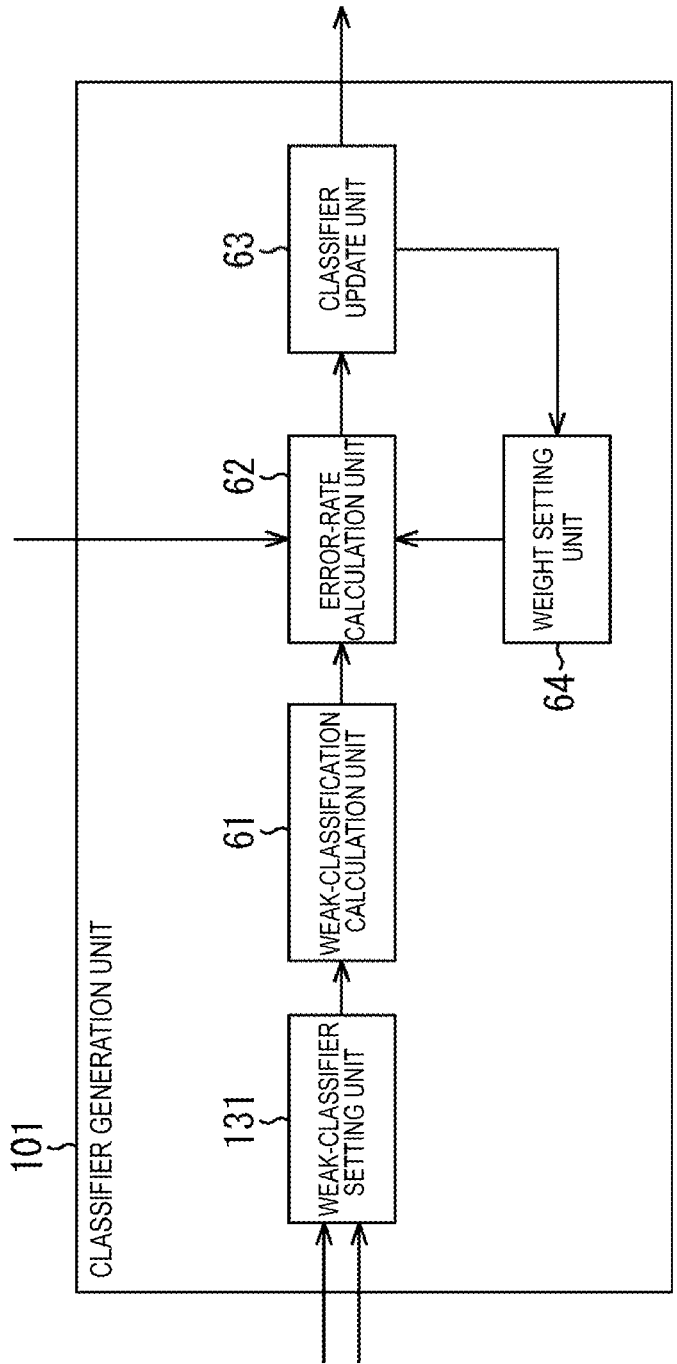
FIG. 10 is a diagram illustrating a configuration example of a classifier generation unit.

[Configuration Example of Classifier Generation Unit]
In addition, the classifier generation unit 101 of FIG. 9 is configured as illustrated in FIG. 10 in further detail. Parts corresponding to those of FIG. 5 are denoted by the same reference numerals in FIG. 10, and description thereof is properly omitted.

The classifier generation unit 101 includes a weak-classifier setting unit 131, a weak-classification calculation unit 61, an error-rate calculation unit 62, a classifier update unit 63, and a weight setting unit 64.

The weak-classifier setting unit 131 sets a weak classifier for every feature point using a feature quantity of a feature point identical with the classification feature quantity of each weak classifier constituting the transfer classifier from the acquisition unit 23 among feature quantities of feature points of the learning image provided from the feature-quantity calculation unit 22. In addition, the weak-classification setting unit 131 provides the weak-classification calculation unit 61 with the set weak classifier and a feature quantity of a feature point of each learning image.

[Description of Transfer Learning Process]
Next, the transfer learning process by the learning device 9 will be described with reference to the flowchart of FIG. 11. In the transfer learning process, a plurality of learning images to which a label "1" is added and a plurality of learning images to which a label "−1" is added are provided to the learning device 91.

Because the process of steps S51 to S54 is the same as in steps S11 to S14 of FIG. 6, description thereof is omitted. However, in step S51, the transfer classifier acquired by the acquisition unit 23 is provided to the weak-classifier setting unit 131. In addition, in step S53, the feature quantity extracted from each feature point of the learning image is provided from the feature-quantity unit 22 to the weak-classifier setting unit 131, and the label of the learning image is provided from the feature-quantity calculation unit 22 to the error-rate calculation unit 62.

In step S55, the weak-classifier setting unit 131 sets a weak classifier on the basis of a feature quantity of each feature point of the learning image provided from the feature-quantity calculation unit 22 and a classification feature quantity of each weak classifier constituting the transfer classifier from the acquisition unit 23.

For example, k transfer classifiers are provided from the acquisition unit 23 to the weak-classifier setting unit 131, and the total number of weak classifiers constituting these transfer classifiers is assumed to be N. That is, the N weak classifiers $f_1(x)$ to $f_N(x)$ are assumed to be provided.

Figure 12:
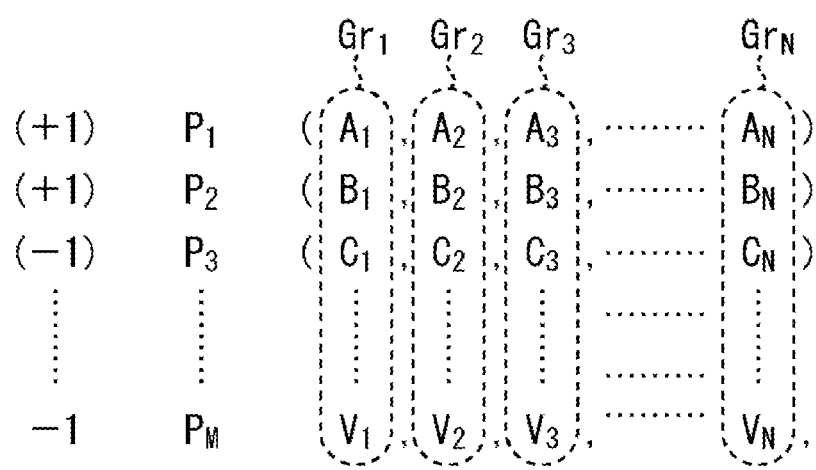
FIG. 12 is a diagram illustrating settings of classifiers.

In this case, as illustrated in FIG. 12, feature quantities of N feature points $FP_n$ corresponding to the weak classifiers $f_1(x)$ to $f_N(x)$ among feature quantities extracted from each learning image $P_m$ (where 1≤m≤M) are used and a weak classifier is set for every feature point.

In FIG. 12, feature quantities extracted from the learning image $P_m$ are arranged in a horizontal direction. For example, in the drawing, $A_1, A_2, A_3, \ldots, A_N$ arranged on an uppermost side in the horizontal direction indicate feature quantities corresponding to classification feature quantities of the weak classifiers $f_1(x)$ to $f_N(x)$ among feature quantities of feature points of the learning image $P_1$. That is, these are feature quantities of feature points on the learning image $P_1$ in the same positions as those of feature points from which feature quantities serving as classification feature quantities are obtained among the feature quantities of feature points of the learning image $P_1$.

In addition, in the drawing of a character "$P_m$" indicating the learning image, a number "+1" or "−1" of the left side indicates a label added to the learning image $P_m$. That is, the number "+1" is a label indicating that the detection target is included in the learning image and the number "−1" is a label indicating that no detection target is included in the learning image.

Further, in FIG. 12, M feature quantities $A_n$ to $V_n$ arranged in a vertical direction are grouped in one group $Gr_n$ (where $1 \leq n \leq N$), and feature quantities belonging to the group $Gr_n$ become feature quantities of the same feature point in the learning images.

The weak-classifier setting unit 131 reorders M feature quantities belonging to the group in descending or ascending order for every group $Gr_n$. The weak-classifier setting unit 131 sets a weak classifier by specifying a function $g(x>thw_n)$, a constant $a_n$, and a constant $b_n$ of the weak classifier shown in Expression (1) for every group on the basis of the label of the learning image.

Figure 13:
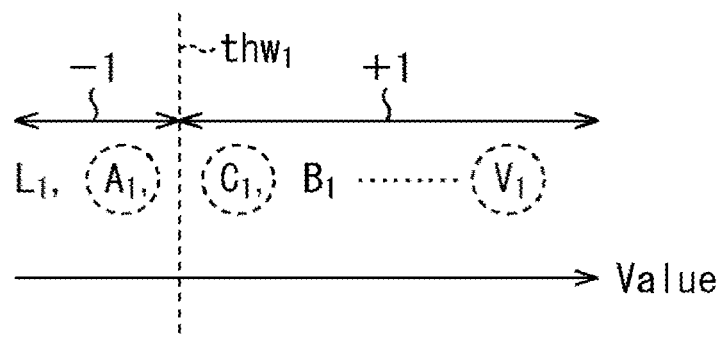
FIG. 13 is a diagram illustrating settings of classifiers.

Specifically, as illustrated in FIG. 13, the feature quantities $A_1$ to $V_1$ belonging to the group $Gr_1$ are sequentially arranged, and the weak-classifier setting unit 131 sets a threshold $thw_1$ specifying a function $g(x>thw_1)$ between feature quantities $A_1$ and $C_1$.

Here, there is no detection target to be recognized in a range in which the feature quantity is less than the threshold $thw_1$, that is, a range indicated by "−1" on the left side from the threshold $thw_1$. In addition, there is a detection target to be recognized in a range in which the feature quantity is greater than the threshold $thw_1$, that is, a range indicated by "+1" on the right side of the drawing from the threshold $thw_1$.

In this example, because the feature quantity $A_1$ surrounded by a dotted line in the drawing is a feature quantity of the learning image including the detection target, this is regarded as an error (false recognition). Likewise, because the feature quantities $C_1$ and $V_1$ surrounded by the dotted line in the drawing are feature quantities of the learning images not including the detection target, these are regarded as an error (false recognition).

The weak-classifier setting unit 131 set a weak classifier by calculating an error rate $E_1$ of the above-described weak classifier $f_1(x)$ for a value of each threshold $thw_1$, for example, while varying the value of the threshold $thw_1$, and specifying the threshold $thw_1$ in which the error rate $E_1$ is minimized. In this case, the weak-classifier setting unit 131 calculates the error rate by acquiring a weight of each learning image from the weight setting unit 64.

When setting a weak classifier with respect to each group, that is, a feature point of a learning image corresponding to a classification feature quantity of each weak classifier of a transfer classifier, the weak-classifier setting unit 131 provides the set weak classifier and the feature quantity of each feature point of the learning image to the weak-classification calculation unit 61.

If the weak classifier is set as described above, then the process of steps S56 to S62 is performed, so that the transfer learning process ends. However, because the process is the same as in steps S15 to S21 of FIG. 6, description thereof is omitted.

Figure 11:
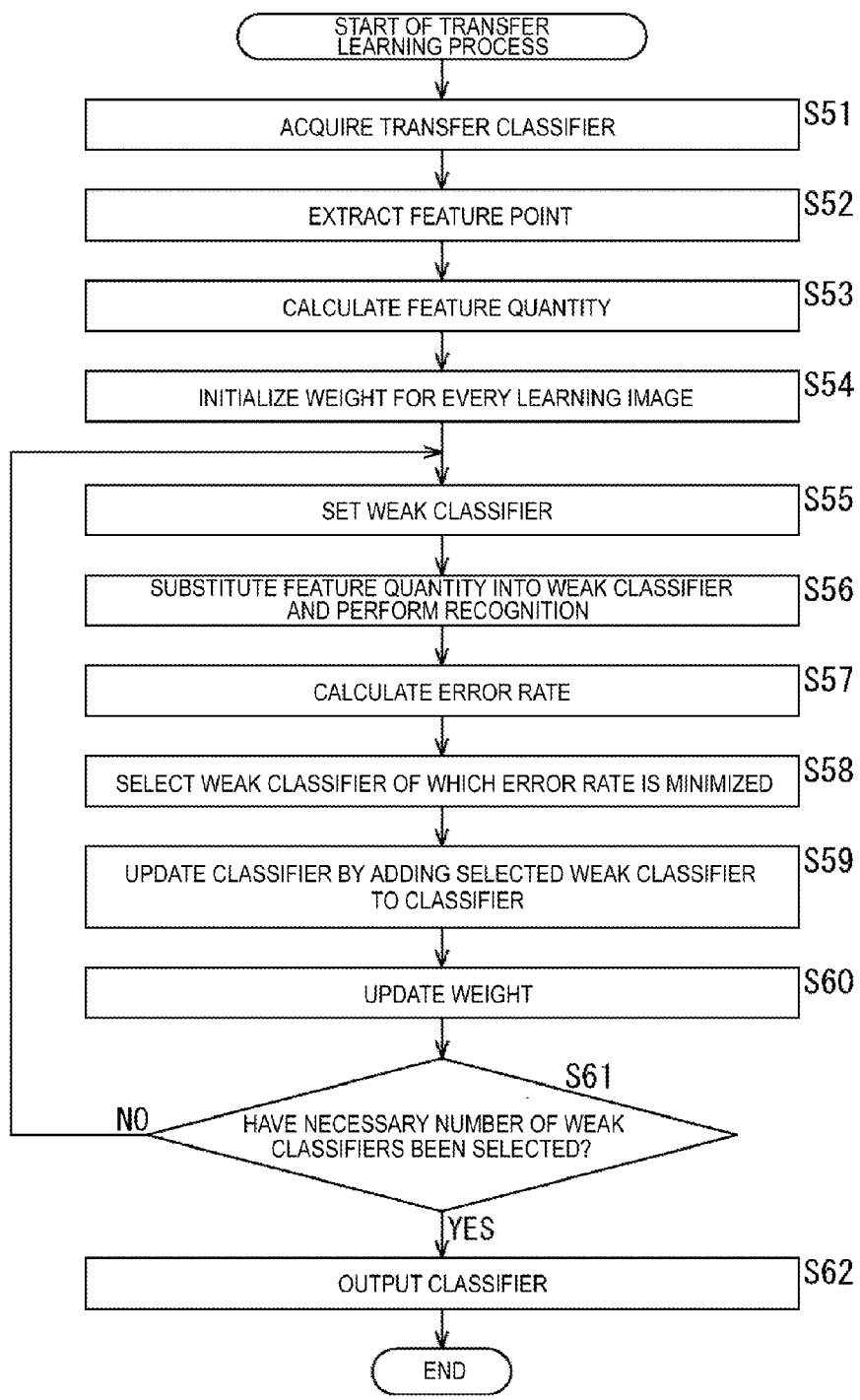
FIG. 11 is a flowchart illustrating the transfer learning process.

However, while a process in which a weak classifier constituting the transfer classifier is used is performed in step S15 of FIG. 6, a process in which the weak classifier set in the process of step S55 is used is performed in step S56 of FIG. 11.

As described above, the learning device 91 performs the boosting-based transfer learning using a learning image and a transfer classifier already obtained by statistical learning.

It is possible to obtain a highly accurate classifier at a higher speed if classification feature quantities of weak classifiers of other classifiers already obtained are used in the boosting-based learning in which the highly accurate classifier can be obtained as described above.

Figure 14:
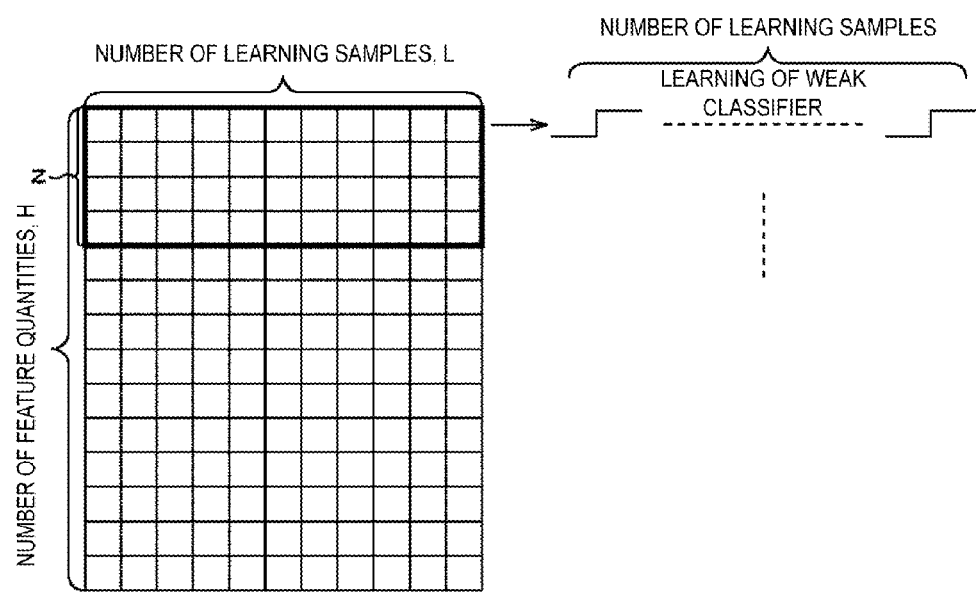
FIG. 14 is a diagram illustrating the effect of learning by the transfer of feature quantities.

For example, as illustrated in FIG. 14, if feature quantities of H feature points are extracted from each of L learning images in the boosting-based transfer learning and a classifier is generated, classification feature quantities of Z weak classifiers (where Z<H) constituting the classifier are transferred.

In addition, a weak classifier is set for every feature point using feature quantities of feature points of learning images corresponding to the Z transferred classification feature quantities. One best weak classifier of the set weak classifiers is selected and added to the classifier, so that a final classifier is obtained by updating the classifier.

On the other hand, because no classifier is transferred in the normal boosting-based learning, a weak classifier is set for every H feature points. Therefore, because it is preferable that a process be performed for feature points of which the number is Z less than H indicating the total number of feature points on each learning image in the boosting-based transfer learning, it is possible to obtain a classifier at a speed that is (H/Z) times faster than in the normal boosting-based learning.

If a classifier and a classification feature quantity generated by the learning device 91 are also recorded on the classifier recording unit 12, the classifier and the classification feature quantity are used for a classification process by the recognition device 13. That is, these are used for the classification process described with reference to FIG. 8.

Third Embodiment

[Classifier of Tree Structure]

Although an example in which a classifier for hand detection of other shapes already obtained is used in learning of a classifier for detecting a specific hand shape has been described above, it is possible to apply the transfer learning to a recognition system using a classifier of a tree structure.

Figure 15:
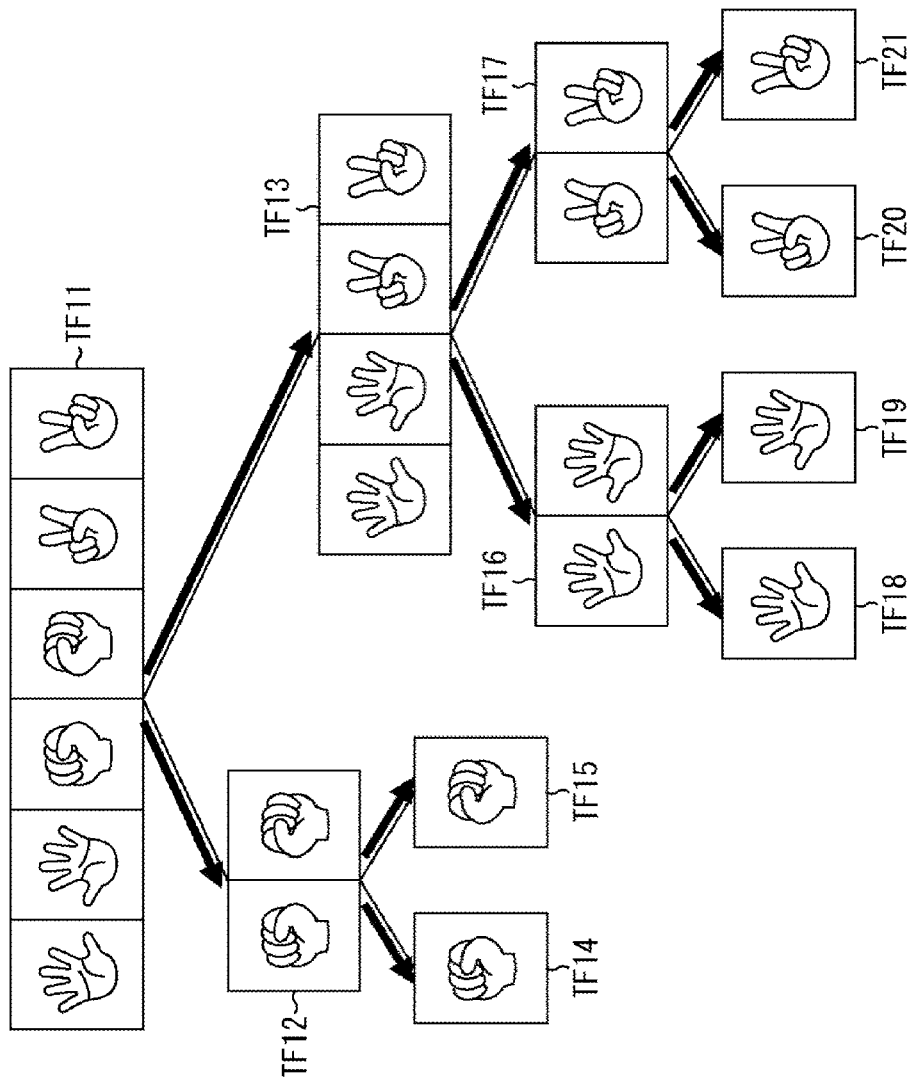
FIG. 15 is a diagram illustrating a classifier of a tree structure.

An example in which a hand shape on the input image is classified using a classifier of a tree structure including 11 classifiers TF11 to TF21 as illustrated in FIG. 15 will be described.

The tree-structure classifier is a classifier for multi-class object recognition, which detects a hand of any shape of a right or left hand of a rock shape, the right or left hand of a paper shape, or the right or left hand of a scissors shape from the input image.

The classifier TF11 constituting the tree-structure classifier is a classifier for detecting the hand from the input image, and particularly, is referred to as a root node. Here, if there is something similar to the hand in the input image without depending upon the hand shape such as the rock or paper in hand detection by the classifier TF11, a recognition result indicating that the hand has been detected is output. In addition, the classifier TF12 is a classifier for detecting the rock shape from the input image and the classifier TF13 is a classifier for detecting the paper or scissors shape from the input image.

The classifiers TF14 and TF15 are each for detecting the right-hand rock and the left-hand rock from the input image, respectively, and the classifiers TF16 and TF17 are classifiers for detecting the hand of the paper shape and the hand of the scissors shape from the input image, respectively.

Further, the classifiers TF18 and TF19 are classifiers for detecting the right-hand paper and the left-hand paper from the input image, respectively, and the classifiers TF20 and TF21 are classifiers for detecting the right-hand scissors and the left-hand scissors from the input image, respectively.

In particular, the classifiers TF14, TF15, and TF18 to TF21 at ends of a tree are referred to as leaves. The classifiers TF12, TF13, TF16, and TF17 are referred to as nodes between the root node and the leaves.

When the hand shape for use in the classifier of the tree structure is classified, hand detection for an input image is performed by the classifier TF11. If the hand is detected from the input image, the classifier TF12 next performs rock detection from the input image and also the classifier TF13 performs paper or scissors detection from the input image.

At this time, if a classification result of the classifier TF12 is more probable than that of the classifier TF13, that is, if the hand of the rock shape is estimated to be present in the input image, classifications by the classifiers TF14 and TF15 for the input image are performed.

As a result, if a classification result of the classifier TF14 is more probable than that of the classifier TF15, the right-hand rock is assumed to have been detected from the input image. If a classification result of the classifier TF15 is more probable than that of the classifier TF14, the left-hand rock is assumed to have been detected from the input image.

In addition, if a classification result of the classifier TF13 is more probable than that of the classifier TF12, that is, if the hand of the paper or scissors shape is estimated to be present in the input image, classifications by the classifiers TF16 and TF17 for the input image are performed.

As a result, if a classification result of the classifier TF16 is more probable than that of the classifier TF17, that is, if the hand of the paper shape is estimated to be present in the input image, classifications by the classifiers TF18 and TF19 for the input image is performed. If the classification result of the classifier TF18 is more probable among the classification results of the classifiers, the right-hand paper is assumed to have been detected from the input image. If the classification result of the classifier TF19 is more probable, the left-hand paper is assumed to have been detected from the input image.

In addition, if a classification result of the classifier TF17 is more probable than that of the classifier TF16, that is, if the hand of the scissors shape is estimated to be present in the input image, classifications by the classifier TF20 and the classifier TF21 for the input image are performed. If the classification result of the classifier TF20 is more probable among the classification results of the classifiers, the right-hand scissors are assumed to have been detected from the input image. If the classification result of the classifier TF21 is more probable, the left-hand scissors are assumed to have been detected from the input image.

As described above, object recognition for the input image is performed by some classifiers in the tree-structure classifier in which multi-class object recognition is possible. According to its result, an object of any class among classes such as the right-hand paper and the left-hand scissors is detected.

In addition, if a classifier serving as a leaf is generated by the boosting-based learning such as AdaBoost, for example, when the tree-structure classifier as described above is intended to be obtained by learning, it is possible to obtain a highly accurate classifier.

Further, if a classifier of each node or root node is generated by the boosting-based transfer learning using classifiers serving as leaves as a transfer classifier, it is possible to obtain a highly accurate classifier at a higher speed by fewer learning samples.

In particular, because a large number of learning images of hands of many shapes such as paper and a rock are necessary when a classifier of a root node is generated by the normal boosting-based learning, an enormous calculation time is necessary. On the other hand, it is possible to significantly improve learning efficiency if the classifier of the leaf is transferred and the classifier of the root node is generated by the transfer learning.

For example, it is preferable that transfer learning be performed using the leaf classifiers TF14, TF15, and TF18 to TF21 as the transfer classifiers when the node classifier TF12 is intended to be obtained.

Specifically, it is possible to obtain the classifier TF12, for example, if the learning device 11 illustrated in FIG. 4 performs the transfer learning process of FIG. 6 by transferring weak classifiers constituting the classifiers TF14, TF15, and TF18 to TF21.

In addition, of course, it is possible to obtain the classifier TF12, for example, if the learning device 91 illustrated in FIG. 9 performs the transfer learning process of FIG. 11 by transferring classification feature quantities of the weak classifiers constituting the classifiers TF14, TF15, and TF18 to TF21.

[Configuration Example of Recognition Device]

Figure 16:
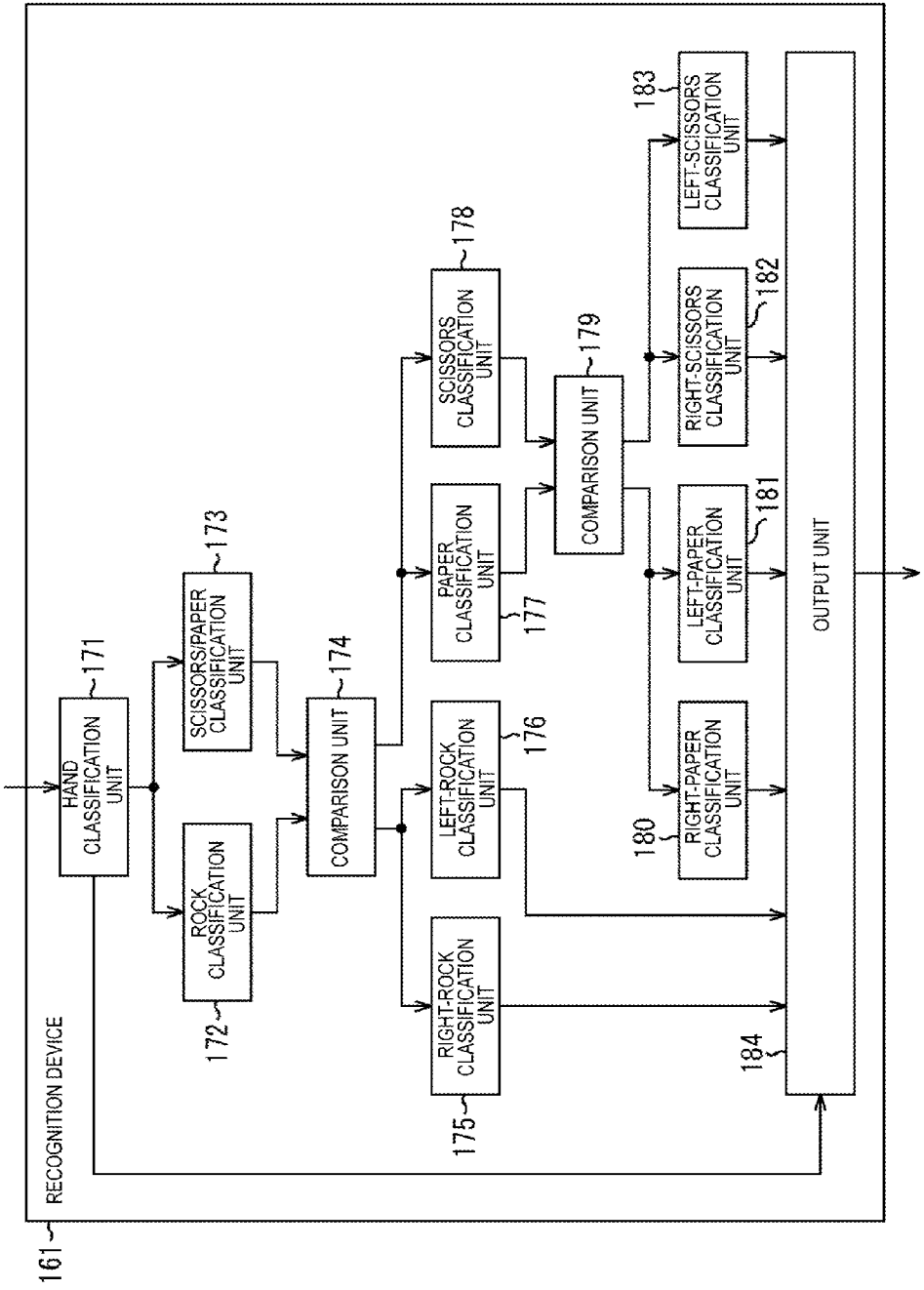
FIG. 16 is a diagram illustrating a configuration example of a recognition device.

Next, the recognition device, which performs multi-class hand-shape recognition using the tree-structure classifier illustrated in FIG. 15, will be described. This recognition device is configured, for example, as illustrated in FIG. 16.

That is, the recognition device 161 includes a hand classification unit 171, a rock classification unit 172, a scissors/paper classification unit 173, a comparison unit 174, a right-rock classification unit 175, a left-rock classification unit 176, a paper classification unit 177, a scissors classification unit 178, a comparison unit 179, a right-paper classification unit 180, a left-paper classification unit 181, a right-scissors classification unit 182, a left-scissors classification unit 183, and an output unit 184.

In the recognition device 161, the classifiers TF11 to TF21 of FIG. 15 are each recorded on the hand classification unit 171, the rock classification unit 172, the scissors/paper classification unit 173, the right-rock classification unit 175, the left-rock classification unit 176, the paper classification unit 177, the scissors classification unit 178, the right-paper classification unit 180, the left-paper classification unit 181, the right-scissors classification unit 182, and the left-scissors classification unit 183.

The hand classification unit 171 detects a hand from an input image provided using the classifier TF11. If the hand has been detected, the hand classification unit 171 provides a classification result indicating that the hand has been detected and the input image to the rock classification unit 172 and the scissors/paper classification unit 173. In addition, the hand classification unit 171 notifies the output unit 184 of the fact that no hand has been detected if no hand has been detected from the input image.

The rock classification unit 172 and the scissors/paper classification unit 173 classify the rock and the paper or scissors on the input image provided from the hand classification unit 171 on the basis of the recorded classifiers TF12 and TF13, and provide the comparison unit 174 with classification results and the input image.

The comparison unit 174 provides the input image to the right-rock classification unit 175 and the left-rock classification unit 176 or the paper classification unit 177 and the scissors classification unit 178 by comparing the classification results provided from the rock classification unit 172 and the scissors/paper classification unit 173.

The right-rock classification unit 175 and the left-rock classification unit 176 classify the right-hand rock and the left-hand rock on the input image provided from the comparison unit 174 on the basis of the recorded classifiers TF14 and TF15, and provide the output unit 184 with their classification results.

The paper classification unit 177 and the scissors classification unit 178 classify the paper and the scissors on the input image provided from the comparison unit 174 on the basis of the recorded classifiers TF16 and TF17, and provide the comparison unit 179 with their classification results and the input image.

The comparison unit 179 provides the input image to the right-paper classification unit 180 and the left-paper classification unit 181 or the right-scissors classification unit 182 and the left-scissors classification unit 183 by comparing the classification results supplied from the paper classification unit 177 and the scissors classification unit 178.

The right-paper classification unit 180 and the left-paper classification unit 181 classify the right-hand paper and the left-hand paper on the input image provided from the comparison unit 179 on the basis of the recorded classifiers TF18 and TF19, and provide their classification results to the output unit 184. The right-scissors classification unit 182 and the left-scissors classification unit 183 classify the right-hand scissors and the left-hand scissors on the input image provided from the comparison unit 179 on the basis of the recorded classifiers TF20 and TF21, and provide their classification results to the output unit 184.

The output unit 184 outputs a hand classification result from the input image on the basis of the classification results from the hand classification unit 171, the right-rock classification unit 175, the left-rock classification unit 176, the right-paper classification unit 180, the left-paper classification unit 181, the right-scissors classification unit 182, and the left-scissors classification unit 183.

[Description of Classification Process]

Figure 17:
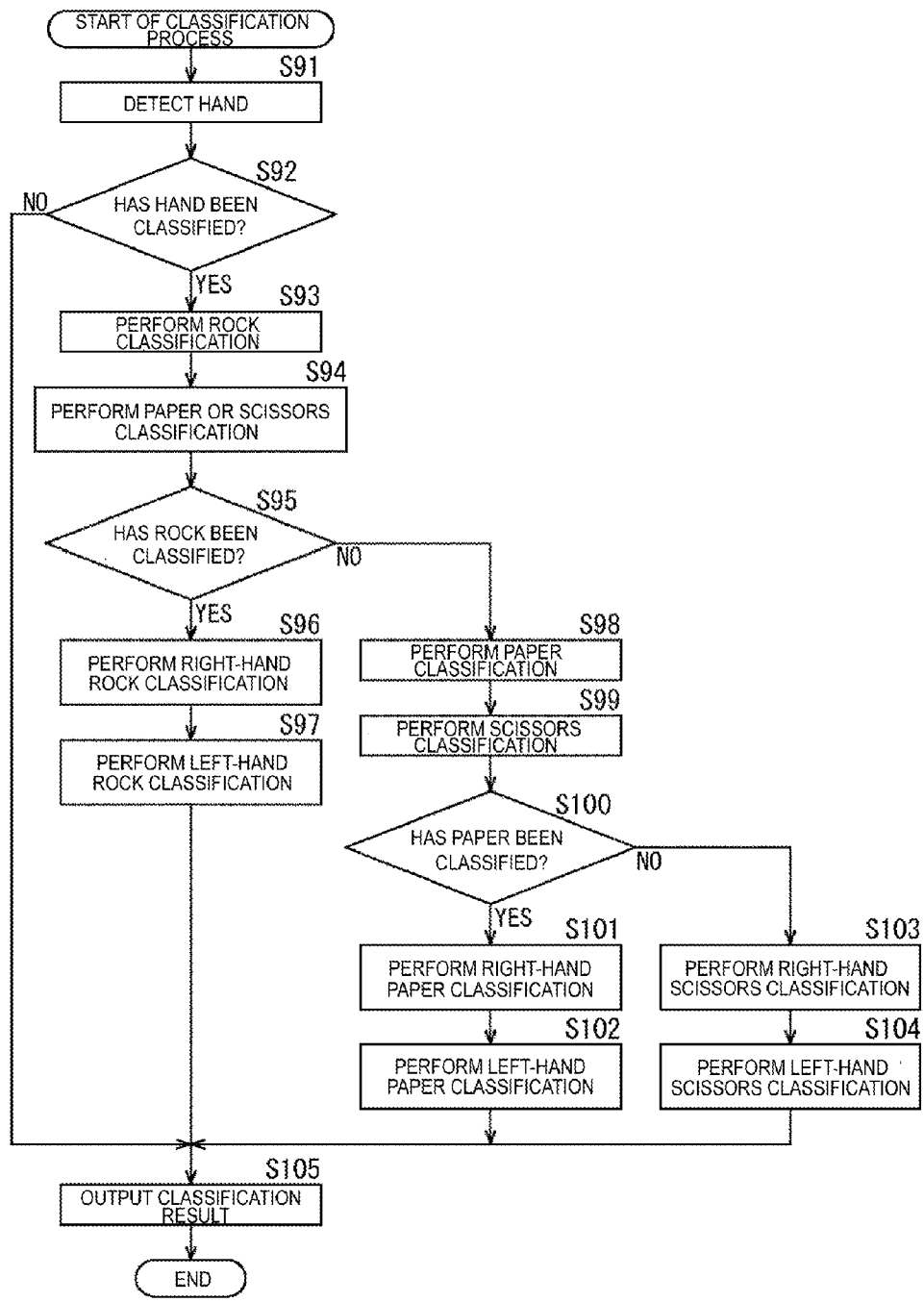
FIG. 17 is a flowchart illustrating a classification process.

If an input image is provided to the recognition device 161 of FIG. 16 and a hand-shape recognition instruction is generated, the recognition device 161 detects a hand from the input image by performing the classification process. Hereinafter, the classification process by the recognition device 161 will be described with reference to the flowchart of FIG. 17.

In step S91, the hand recognition unit 171 detects the hand from the input image provided using the classifier TF11. That is, the hand classification unit 171 extracts a feature quantity from the input image and substitutes the feature quantity into the classifier TF11. If its calculation result is greater than a predetermined threshold, the hand is assumed to have been detected from the input image.

In step S92, the hand classification unit 171 determines whether or not the hand has been detected from the input image. If no hand is determined to have been detected in step S92, its determination result is provided to the output unit 184 and the process proceeds to step S105.

On the other hand, if the hand is determined to have been detected in step S92, the hand classification unit 171 provides the rock classification unit 172 and the scissors/paper classification unit 173 with the classification result indicating that the hand has been detected, and the process proceeds to step S93.

In step S93, the rock classification unit 172 performs the classification of a rock from the input image provided from the hand classification unit 171 on the basis of the recorded classifier TF12. That is, the rock classification unit 172 extracts a feature quantity from the input image, substitutes the extracted feature quantity into the classifier TF12, and provides the comparison unit 174 with an output value obtained as its calculation result and the input image.

The output value obtained as described above indicates rock-hand likelihood of the input image. When the output value is large, the input image is likely to be an image of a rock-shaped hand. In other classifiers, an output value obtained by substituting a feature quantity into a classifier indicates the likelihood of an object detected by the classifier, that is, a specific hand shape herein.

In step S94, the scissors/paper classification unit 173 performs the classification of the paper or scissors from the input image provided from the hand classification unit 171 on the basis of the recorded classifier TF13. That is, the scissors/paper classification unit 173 extracts a feature quantity from the input image, substitutes the extracted feature quantity into the classifier TF13, and provides the comparison unit 174 with an output value obtained as its calculation result and the input image.

In step S95, the comparison unit 174 determines whether or not the rock on the input image has been classified by comparing the output value from the rock classification unit 172 to the output value from the scissors/paper classification unit 173. For example, if the output value from the rock classification unit 172 is greater than the output value from the scissors/paper classification unit 173, the rock is determined to have been classified because the rock is more likely to be included in the input image than the scissors or the paper.

If the rock is determined to have been classified in step S95, the comparison unit 174 provides the input image to the right-rock classification unit 175 and the left-rock classification unit 176, and the process proceeds to step S96.

In step S96, the right-rock classification unit 175 performs the classification of a right-hand rock from the input image provided from the comparison unit 174 on the basis of the recorded classifier TF14. That is, the right-rock classification unit 175 extracts a feature quantity from the input image, substitutes the extracted feature quantity into the classifier TF14, and provides the output unit 184 with an output value obtained as its calculation result.

In step S97, the left-rock classification unit 176 performs the classification of a left-hand rock from the input image provided from the comparison unit 174 on the basis of the recorded classifier TF15. That is, the left-rock classification unit 176 extracts a feature quantity from the input image, substitutes the extracted feature quantity into the classifier TF15, and provides the output unit 184 with an output value obtained as its calculation result. If the process of step S97 is performed, then the process proceeds to step S105.

In addition, if no rock is determined to have been classified on the input image in step S95, that is, if the paper or the scissors on the input image has been classified, the comparison unit 174 provides the input image to the paper classification unit 177 and the scissors classification unit 178 and the process proceeds to step S98.

In step S98, the paper classification unit 177 performs the classification of the paper from the input image provided from the comparison unit 174 on the basis of the recorded classifier TF16. That is, the paper classification unit 177 extracts a feature quantity from the input image, substitutes the extracted feature quantity into the classifier TF16, and provides the comparison unit 179 with an output value obtained as its calculation result and the input image.

In step S99, the scissors classification unit 178 performs the classification of the scissors from the input image provided from the comparison unit 174 on the basis of the recorded classifier TF17. That is, the scissors classification unit 178 extracts a feature quantity from the input image, substitutes the extracted feature quantity into the classifier TF17, and provides the comparison unit 179 with an output value obtained as its calculation result and the input image.

In step S100, the comparison unit 179 determines whether the paper on the input image has been classified by comparing the output value from the paper classification unit 177 to the output value from the scissors classification unit 178. For example, if the output value from the paper classification unit 177 is greater than the output value from the scissors classification unit 178, the paper is determined to have been classified.

If the paper is determined to have been classified in step S100, the comparison unit 179 provides the input image to the right-paper classification unit 180 and the left-paper classification unit 181 and the process proceeds to step S101.

In step S101, the right-paper classification unit 180 classifies the right-hand paper from the input image provided from the comparison unit 179 on the basis of the recorded classifier TF18. That is, the right-paper classification unit 180 extracts a feature quantity from the input image, substitutes the extracted feature quantity into the classifier TF18, and provides the output unit 184 with an output value obtained as its calculation result.

In step S102, the left-paper classification unit 181 classifies the left-hand paper from the input image provided from the comparison unit 179 on the basis of the recorded classifier TF19. That is, the left-paper classification unit 181 extracts a feature quantity from the input image, substitutes the extracted feature quantity into the classifier TF19, and provides the output unit 184 with an output value obtained as its calculation result. If the process of step S102 is performed, then the process proceeds to step S105.

Further, if no paper is determined to have been classified, that is, if the scissors are determined to have been classified in step S100, the comparison unit 179 provides the input image to the right-scissors classification unit 182 and the left-scissors classification unit 183 and the process proceeds to step S103.

In step S103, the right-scissors classification unit 182 classifies the right-hand scissors from the input image provided from the comparison unit 179 on the basis of the recorded classifier TF20. That is, the right-scissors classification unit 182 extracts a feature quantity from the input image, substitutes the extracted feature quantity into the classifier TF20, and provides the output unit 184 with an output value obtained as its calculation result.

In step S104, the left-scissors classification unit 183 classifies the left-hand scissors from the input image provided from the comparison unit 179 on the basis of the recorded classifier TF21. That is, the left-scissors classification unit 183 extracts a feature quantity from the input image, substitutes the extracted feature quantity into the classifier TF21, and provides the output unit 184 with an output value obtained as its calculation result. If the process of step S104 is performed, then the process proceeds to step S105.

If no hand is determined to have been detected in step S92, if the left-hand rock has been classified in step S97, if the left-hand paper has been classified in step S102, or if the left-hand scissors have been classified in step S104, the process of step S105 is performed.

That is, in step S105, the output unit 184 outputs a final hand classification result from the input image on the basis of the classification results from the hand classification unit 171, the right-rock classification unit 175 and the left-rock classification unit 176, the right-paper classification unit 180 and the left-paper classification unit 181, or the right-scissors classification unit 182 and the left-scissors classification unit 183.

Specifically, if no hand is determined to have been detected in step S92, that is, if a classification result indicating that no hand has been detected has been provided from the hand classification unit 171, the output unit 184 outputs the classification result as a final classification result.

In addition, if the output values from the right-rock classification unit 175 and the left-rock classification unit 176 have been provided according to the process of steps S96 and S97, the output unit 184 outputs the classification result indicated by a larger output value between the output values as a final classification result. For example, if the output value from the right-rock classification unit 175 is larger, the classification result indicating that the right-hand rock has been classified is output.

Further, if the output values from the right-paper classification unit 180 and the left-paper classification unit 181 have been provided according to the process of steps S101 and S102, the output unit 184 outputs the classification result indicated by a larger output value between the output values as a final classification result. In addition, if the output values from the right-scissors classification unit 182 and the left-scissors classification unit 183 have been provided according to the process of steps S103 and S104, the output unit 184 outputs the classification result indicated by a larger output value between the output values as a final classification result. If the final classification result is output from the output unit 184 as described above, the classification process ends.

As described above, the recognition device 161 classifies an object on the input image using a classifier of a tree structure, and outputs its classification result. If the classifier obtained by boosting-based transfer learning is used as the tree-structure classifier, it is possible to classify the object with a high accuracy.

The above-described series of processing may be performed by hardware or may be performed by software. When the series of processing is performed by software, a program forming the software is installed into a computer that is incorporated in a dedicated hardware, or installed from a program storage medium into a general-purpose personal computer, for example, that can perform various types of functions by installing various types of programs.

FIG. 18 is a block diagram showing a hardware configuration example of a computer that performs the above-described series of processing using a program.

In the computer, a central processing unit (CPU) 301, a read only memory (ROM) 302 and a random access memory (RAM) 303 are mutually connected by a bus 304.

Further, an input/output interface 305 is connected to the bus 304. Connected to the input/output interface 305 are an input portion 306 formed by a keyboard, a mouse, a microphone and the like, an output portion 307 formed by a display, a speaker and the like, a storage portion 308 formed by a hard disk, a nonvolatile memory and the like, a communication portion 309 formed by a network interface and the like, and a drive 310 that drives a removable media 311 that is a magnetic disk, an optical disk, a magneto-optical disk, or a semiconductor memory and the like.

In the computer configured as described above, the CPU 301 loads a program that is stored, for example, in the storage portion 308 onto the RAM 303 via the input/output interface 305 and the bus 304, and executes the program. Thus, the above-described series of processing is performed.

The program executed by the computer (the CPU 301) is recorded in the removable media 311, which is a package media formed by, for example, a magnetic disc (including a flexible disk), an optical disk (a compact disc read only memory (CD-ROM), a digital versatile disc (DVD) or the like), a magneto optical disk, or a semiconductor memory etc. Alternatively, the program is provided via a wired or wireless transmission media, such as a local area network, the Internet and a digital satellite broadcast.

Then, by inserting the removable media 311 into the drive 310, the program can be installed in the storage portion 908 via the input/output interface 305. Further, the program can be received by the communication portion 309 via a wired or wireless transmission media and installed in the storage portion 908. Moreover, the program can be installed in advance in the ROM 302 or the storage portion 908. It should be noted that the program executed by a computer may be a program that is processed in time series according to the sequence described in this specification or a program that is processed in parallel or at necessary timing such as upon calling.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below:

(1)
A learning device including:
a feature-quantity extraction unit for extracting a feature quantity from a feature point of a learning image with respect to each of a plurality of learning images including a learning image including a detection target and a learning image not including the detection target;
a weak-classification calculation unit for calculating a classification result of the detection target according to a weak classifier for every learning image by substituting the feature quantity corresponding to the weak classifier into the weak classifier with respect to each of a plurality of weak classifiers constituting a transfer classifier, which is a classifier for detecting the detection target obtained by statistical learning; and
a classifier generation unit for generating the classifier for detecting the detection target using the weak classifier selected from the plurality of weak classifiers on the basis of the classification result.

(2)
The learning device according to (1), further including:
a weight setting unit for setting a weight of the learning image based on the classification result; and
an error-rate calculation unit for calculating an error rate of the weak classifier based on the classification result of each learning image according to the weak classifier and the weight,
wherein the classifier generation unit selects the weak classifier based on the error rate.

(3)
The learning device according to (1) or (2), wherein the classifier generated by the classifier generation unit is used for multi-class object recognition.

(4)
The learning device according to any one of claims (1) to (3), wherein:
the classifier generated by the classifier generation unit is a classifier constituting a classifier of a tree structure, and
the transfer classifier is a classifier constituting a leaf of the classifier of the tree structure.

(5)
A learning method for use in a learning device including a feature-quantity extraction unit for extracting a feature quantity from a feature point of a learning image with respect to each of a plurality of learning images including a learning image including a detection target and a learning image not including the detection target, a weak-classification calculation unit for calculating a classification result of the detection target according to a weak classifier for every learning image by substituting the feature quantity corresponding to the weak classifier into the weak classifier with respect to each of a plurality of weak classifiers constituting a transfer classifier, which is a classifier for detecting the detection target obtained by statistical learning, and a classifier generation unit for generating the classifier for detecting the detection target using the weak classifier selected from the plurality of weak classifiers on the basis of the classification result, the learning method including:
extracting, by the feature-quantity extraction unit, the feature quantity from the learning image;
calculating, by the weak-classification calculation unit, the classification result; and
generating, by the classifier generation unit, the classifier.

(6)
A program for causing a computer to execute:
extracting a feature quantity from a feature point of a learning image with respect to each of a plurality of learning images including a learning image including a detection target and a learning image not including the detection target;
calculating a classification result of the detection target according to a weak classifier for every learning image by substituting the feature quantity corresponding to the weak classifier into the weak classifier with respect to each of a plurality of weak classifiers constituting a transfer classifier, which is a classifier for detecting the detection target obtained by statistical learning; and
generating the classifier for detecting the detection target using the weak classifier selected from the plurality of weak classifiers on the basis of the classification result.

(7)
A learning device including:
a feature-quantity extraction unit for extracting a feature quantity from a feature point of a learning image with respect to each of a plurality of learning images including a learning image including a detection target and a learning image not including the detection target;
a weak-classifier setting unit for generating a weak classifier based on the feature quantity corresponding to a transfer weak classifier constituting a transfer classifier, which is a classifier for detecting the detection target obtained by statistical learning, among feature quantities extracted from the learning image and the learning image;
a weak-classification calculation unit for calculating a classification result of the detection target according to the weak classifier for every learning image by substituting the feature quantity corresponding to the weak classifier into the weak classifier; and
a classifier generation unit for generating the classifier for detecting the detection target using the weak classifier selected from the plurality of weak classifiers on the basis of the classification result.

(8)
The learning device according to (7), further including:
a weight setting unit for setting a weight of the learning image based on the classification result; and
an error-rate calculation unit for calculating an error rate of the weak classifier based on the classification result of each learning image according to the weak classifier and the weight,
wherein the classifier generation unit selects the weak classifier based on the error rate.

(9)
The learning device according to (7) or (8), wherein the classifier generated by the classifier generation unit is used for multi-class object recognition.

(10)
The learning device according to any one of (7) to (9), wherein:
the classifier generated by the classifier generation unit is a classifier constituting a classifier of a tree structure, and
the transfer classifier is a classifier constituting a leaf of the classifier of the tree structure.

(11)
A learning method for use in a learning device including a feature-quantity extraction unit for extracting a feature quantity from a feature point of a learning image with respect to each of a plurality of learning images including a learning image including a detection target and a learning image not including the detection target, a weak-classifier setting unit for generating a weak classifier based on the feature quantity corresponding to a transfer weak classifier constituting a transfer classifier, which is a classifier for detecting the detection target obtained by statistical learning, among feature quantities extracted from the learning image and the learning image, a weak-classification calculation unit for calculating a classification result of the detection target according to the weak classifier for every learning image by substituting the feature quantity corresponding to the weak classifier into the weak classifier, and a classifier generation unit for generating the classifier for detecting the detection target using the weak classifier selected from the plurality of weak classifiers on the basis of the classification result, the learning method including:
extracting, by the feature-quantity extraction unit, the feature quantity from the learning image;
generating, by the weak-classifier setting unit, the weak classifier;
calculating, by the weak-classification calculation unit, the classification result; and
generating, by the classifier generation unit, the classifier.

(12)
A program for causing a computer to execute:
extracting a feature quantity from a feature point of a learning image with respect to each of a plurality of learning images including a learning image including a detection target and a learning image not including the detection target;
generating a weak classifier based on the feature quantity corresponding to a transfer weak classifier constituting a transfer classifier, which is a classifier for detecting the detection target obtained by statistical learning, among feature quantities extracted from the learning image and the learning image;
calculating a classification result of the detection target according to the weak classifier for every learning image by substituting the feature quantity corresponding to the weak classifier into the weak classifier; and
generating the classifier for detecting the detection target using the weak classifier selected from the plurality of weak classifiers on the basis of the classification result.

It should be understood by those skilled in the art that various modifications, combinations, sub-combinations and alterations may occur depending on design requirements and other factors insofar as they are within the scope of the appended claims or the equivalents thereof.

What is claimed is:
1. An information processing device, comprising:
one or more processors configured to:
extract a first feature quantity and a second feature quantity based on a transfer classifier provided by an external device;
determine a classification result based on the first feature quantity and the second feature quantity,
wherein the first feature quantity and second feature quantity are extracted from a feature point of each learning image of a plurality of learning images, the plurality of learning images including a first learning image including a first detection target and a second learning image in which the first detection target is absent;
calculate an error rate of recognition of the first detection target in one of the plurality of learning images based on the determined classification result corresponding to the one of the plurality of learning images and a first label attached to the one of the plurality of learning images,
wherein the first label is a numeric value; and
recognize the first detection target based on a second label attached to the first feature quantity and a third label attached to the second feature quantity,
wherein each of the second label and the third label is a numeric value,
wherein the first label corresponds to a first status of the first detection target, wherein the first status corresponds to status of addition of the first detection target to the plurality of learning images, and
wherein the second label and the third label corresponds to a second status of the first detection target, wherein the second status corresponds to status of the recognition of the first detection target.

2. The information processing device according to claim 1, wherein the one or more processors are further configured to generate a classifier based on the first feature quantity and the second feature quantity.

3. The information processing device according to claim 2, wherein a multi-class object recognition is based on the generated classifier.

4. The information processing device according to claim 2, wherein the recognition of the first detection target and a second detection target is based on the generated classifier, wherein the second detection target is different from the first detection target.

5. The information processing device according to claim 2, wherein a classification tree structure is based on the generated classifier, and the classification tree structure comprises the transfer classifier, wherein the transfer classifier is a leaf.

6. The information processing device according to claim 2,
wherein the transfer classifier detects the first detection target based on a first state of the first detection target, and
wherein the generated classifier detects the first detection target based on a second state of the first detection target.

7. The information processing device according to claim 2,
wherein the first detection target is a part of a human body, and
wherein the one or more processors are further configured to differentiate between orientations of the part of the human body.

8. The information processing device according to claim 7,
wherein the recognition of the first detection target and a second detection target is based on the generated classifier, wherein the second detection target is different from the first detection target, and
wherein the first detection target is a hand in a rock orientation, and the second detection target is the hand in a scissors orientation.

9. The information processing device according to claim 1, wherein the one or more processors are further configured to generate a result of classification of the first detection target based on the first feature quantity and the second feature quantity.

10. An information processing method, comprising:
in an information processing device:
extracting a first feature quantity and a second feature quantity based on a transfer classifier provided by an external device;
determining a classification result based on the first feature quantity and the second feature quantity,
wherein the first feature quantity and second feature quantity are extracted from a feature point of each learning image of a plurality of learning images, the plurality of learning images including a first learning image including a detection target and a second learning image in which the detection target is absent;
calculating an error rate of recognition of the detection target in one of the plurality of learning images based on the determined classification result corresponding to the one of the plurality of learning images and a first label attached to the one of the plurality of learning images,
wherein the first label is a numeric value; and
recognizing the detection target based on a second label attached to the first feature quantity and a third label attached to the second feature quantity,
wherein each of the second label and the third label is a numeric value,
wherein the first label corresponds to a first status of the detection target, wherein the first status corresponds to status of addition of the detection target to the plurality of learning images, and
wherein the second label and the third label corresponds to a second status of the detection target, wherein the second status corresponds to status of the recognition of the detection target.

11. A non-transitory computer-readable medium having stored thereon, computer-executable instructions, which when executed by an information processing device, cause the information processing device to execute operations, the operations comprising:
extracting a first feature quantity and a second feature quantity based on a transfer classifier provided by an external device;
determining a classification result based on the first feature quantity and the second feature quantity,
wherein the first feature quantity and second feature quantity are extracted from a feature point of each learning image of a plurality of learning images, the plurality of learning images including a first learning image including a detection target and a second learning image in which the detection target is absent;
calculating an error rate of recognition of the detection target in one of the plurality of learning images based on the determined classification result corresponding to the one of the plurality of learning images and a first label attached to the one of the plurality of learning images,
wherein the first label is a numeric value; and
recognizing the detection target based on a second label attached to the first feature quantity and a third label attached to the second feature quantity,
wherein each of the second label and the third label is a numeric value,
wherein the first label corresponds to a first status of the detection target, wherein the first status corresponds to status of addition of the detection target to the plurality of learning images, and
wherein the second label and the third label corresponds to a second status of the detection target, wherein the second status corresponds to status of the recognition of the detection target.

* * * * *